US008838559B1

(12) United States Patent
O'Riordan

(10) Patent No.: US 8,838,559 B1
(45) Date of Patent: Sep. 16, 2014

(54) DATA MINING THROUGH PROPERTY CHECKS BASED UPON STRING PATTERN DETERMINATIONS

(75) Inventor: Donald J. O'Riordan, Sunnyvale, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 318 days.

(21) Appl. No.: 13/034,508

(22) Filed: Feb. 24, 2011

(51) Int. Cl.
  *G06F 7/00* (2006.01)
  *G06F 17/30* (2006.01)

(52) U.S. Cl.
  CPC .............................. *G06F 17/30563* (2013.01)
  USPC ............ 707/702; 707/687; 707/672; 707/601

(58) Field of Classification Search
  CPC .................... G06F 17/30286; G06F 17/30159; G06F 17/30563
  USPC ............. 707/702, 999.01, 601, 687, 672, 776
  See application file for complete search history.

(56) References Cited

U.S. PATENT DOCUMENTS

| | | | |
|---|---|---|---|
| 5,950,201 A * | 9/1999 | Van Huben et al. .................. 1/1 |
| 6,697,880 B1 * | 2/2004 | Dougherty .................... 719/320 |
| 7,516,423 B2 * | 4/2009 | De Smedt et al. ............. 716/132 |
| 8,060,357 B2 * | 11/2011 | Segond et al. .................... 704/1 |
| 8,271,931 B2 * | 9/2012 | Chen et al. ..................... 716/133 |
| 8,312,322 B2 * | 11/2012 | Gururaj ........................... 714/25 |
| 8,332,765 B2 * | 12/2012 | Ergan et al. .................... 715/764 |
| 2005/0268271 A1 * | 12/2005 | Gutberlet et al. ............... 716/18 |
| 2007/0234305 A1 * | 10/2007 | Mishra et al. .................. 717/128 |
| 2009/0282391 A1 * | 11/2009 | Gutierrez et al. ............. 717/128 |
| 2010/0318592 A1 * | 12/2010 | Han et al. ...................... 708/235 |
| 2011/0202864 A1 * | 8/2011 | Hirsch et al. ................... 715/773 |
| 2012/0084847 A1 * | 4/2012 | Balasubramanian et al. .... 726/7 |

OTHER PUBLICATIONS

Boule, Marc, et al., "Automata-based assertion-checker synthesis of PSL properties", ACM Transactions on Design Automation of Electronic Systems, 13(1), (Jan. 2008), 4:1-4:21.
Glazberg, Ziv, et al., "PSL: Beyond Hardware Verification", *Next Generation Design and Verification Methodologies for Distributed Embedded Control Systems*, S. Ramesh and P. Sampath (eds.), (2007), 245-260.

* cited by examiner

*Primary Examiner* — Miranda Le
(74) *Attorney, Agent, or Firm* — Kenyon & Kenyon LLP

(57) ABSTRACT

A method is provided to evaluate user interaction with a computer user interface (UI) comprising: receiving a property definition that identifies at least one relationship among prescribed string patterns that correspond to one or more UI events; receiving a log file in a computer readable storage device that includes a plurality of respective chunks of information; determining whether the respective chunks of information within the log file includes a respective string pattern that matches at least one of the prescribed string patterns; configuring a processor to produce an indication of whether the property is satisfied based upon the string pattern matching determinations.

23 Claims, 18 Drawing Sheets

FIG. 1A Start
FIG. 1B Pan Down
FIG. 1C Pan Right
FIG. 1D Delete
FIG. 1E Move
FIG. 1F Unmove
FIG. 1G Undo Delete

```
\a  mouseSingleSelectPt()
\i  165.665:172.635
\r  t
\a  leHiDelete()
\r  t
\a  leHiMove()
\p  >
\a  mouseAddPt()
\i  168.3035:158.6145
\r  t
\a  mouseAddPt(t)
\i  166.2415:173.709
\r  t
\a  hiUndo
\r  t
\a  hiUndo()
\r  t
```

FIG. 2

```
\a  mouseAddPt(t)
\i  168.3035:158.6145
\r  t
\a  mouseAddPt(t)
\i  166.2415:173.709
\r  t
\a  hiUndo()
\r  t
\a  hiUndo()         }— 502
\r  t
\#  Available memory: 5178996 (0x4f0674) kilobytes
    UTC 2011.01.07 22:07:02.479
\a  hiZoomIn()
\i  144.22:177.75
\p  >
```

FIG. 5

```
vunit zoom (NULL) {
// 'modeling layer' . Pure Python
from vsyz import VSys
from zoom_cmd import ZoomPattern, PanPattern      } 1102
vs = VSys()
zp = ZoomPattern()
pp = PanPattern // default clocking. Pure Python expression
default clock = (vs.any_line(line)) ;

// property to define a completed zoom command
// This is a hybrid of PSL and Python expressions // zooms that the user attempted, may have cancelled or not
started_zoom: assert always "zp.start(line)" abort "not zp.start(line)" ;
//started_zoom assert always "zp.start(line)" ;

// any zoom that fully completes. If cancelled mid-stream, consider itr 'failed'
completed_zoom: assert always "zp.start(line)" -> { [*0:6]; "vs.enter_point(line)"; [*0:6] ;
"vs.enter_point(line)" ; "vs.response(line)" } ;

// zooms that get cancelled mid-stream are not counted as 'failed'
abortable_zoom: assert always "zp.start(line)" -> ( { [*0:6]; "vs.enter_point(line)"; [*0:6] ;
"vs.enter_point(line)" ; "vs.response(line)" }  abort "vs.user_cancel(line)") ;

// zooms that were started, but cancelled before finishing
cancelled_zoom: assert always ("zp.start(line)" -> next ("vs.user_cancel(line)" before
"vs.response(line)) @("vs.usercmd(line)") ;

// zoom with embedded single pan operation
zoom_with_single_pan: assert always "zp.start(line)" -> { [*0:6] ; "vs.enter_point(line)" ;
[*0:2] ; "pp.pan(line)" ; "vs.response(line)" ; [*0:2] ; "vs.enter_point(line)";
"vs.response(line)" } ;

// zoom with embedded dual pan operation
zoom_with_dual_pan: assert always "zp.start(line)" -> { [*0:6]; "vs.enter_point(line)" ;
[*0:2] ; "pp.pan(line)" ; "vs.response(line)" ; "pp.pan(line)"; "vs.reponse(line)" ; [*0:2] ;
"vs.enter_point(line)" ; "vs.response(line)" } ;

// zoom with embedded (one to 10) pans
zoom_with_embedded_pan: assert always "zp.start(line)" -> { [*0:6]; "vs.enter_point(line)" ;
[*0:2] ; {{ "pp.pan(line)" ; "vs.response(line)" } [*0:10] } ; [*0:6] ; "vs.enter_point(line)" ;
"vs.response(line)" } ;

```
""" Common/System Wide CDS.log parsing functions """
import re
    _patt_enter_point = re.compiler(r'^\\i\s+-?\d+\.\d+:-?\d+\.\d+')
    _patt_response = re.compiler(r'^\\r\s+(t|nil)')
    _patt_pound = re.compile(r'^\\#\s+(t|nil)')
    _patt_user_cmd = re.compile(r'^\\a\s+')
    _patt_user_input = re.compile(r'^\\(a|i)\s+')
    _patt_user_input_or_response = re.compile(r'^\\(a|i|r)\s+')
    _patt_user_cancel = re.compile(r'^\\a cancelEnterFun')
    _patt_any_line = re.compile(r'^\\a|i|r|o|e|w|p|#)\s+')
    _patt_not_output = re.compile(r'^\\a|i|r|e|w|p|#)\s+')
    _patt_not_error = re.compile(r'^\\a|i|r|o|w|p|#)\s+')
    _patt_not_warning = re.compile(r'^\\a|i|r|o|e|p|#)\s+')
    _patt_not_verbose = re.compile(r'^\\a|i|r|p)\s+')
    _patt_mouse_add_point = re.compile(r'^\\a\s+mouseAddPt')
class VSys:
    "CDS.log 'system' parsing methods."

def mouse_add_point(cls, line):
        'recognize a mouse add point'
        return line.startswith(r'\a mouseAddPt')

def enter_point(cls, line):
        'recognize an enter point'
        return _patt_enter_point.match(line)

def response(cls, line):
        'recognize a generic system response'
        return _patt_response.match(line)

def pound(cls, line):
        'recognize a generic system response'
        return _patt_pound.match(line)

def user_cmd(cls, line):                    ⎫
        'recognize a user cmd line'             ⎬ 1202
        return line.startswith(r'\a ')          ⎭ def user_input(cls, line):
        'recognize a user input line'
        return _patt_user_input.match(line)

def user_input_or_response(cls, line):
        'recognize a user input or response line'
        return _patt_user_input_or_response.match(line)

def user_cancel(cls, line):
        return _patt_user_cancel.match(line)

def any_line(cls, line):
        return line.startswith('\\')

def not_output(cls, line):
```

FIG. 12A

```
        return _patt_not_output.match(line)

def not_error(cls, line):
    return _patt_not_error.match(line)

def not_warning(cls, line):
    return _patt_not_warning.match(line)

def not_verbose(cls, line):
    return _patt_not_verbose.match(line)
```

FIG. 12B

```
""" Python support code for Zoom pattern recognition """

class PanPattern
    "Pan class"
    import re
    patt_pan_abs = re.compiler(r'\\a\s+hiAbsolutePan')

def pan(self, line):
        'recognize a pan action'
        return PanPattern.patt_pan_abs.match(line)

class ZoomPattern
    """ Zoom class """
                                              1302
    import re                           ⌠‾‾‾‾‾‾‾‾‾‾‾‾‾‾‾‾‾⌡
    patt_zoom_in = re.compiler(r'^\\a\s+hiZoomIn')
    patt_any_zoom = re.compiler(r'^\\a\s+.*Zoom.*')

def start(self, line):
        'recognize a zoom sequence start, return 1 else 0'
        return ZoomPattern.patt_zoom_in.match(line)

def any_zoom(self, line):
        'recognize any kind of zoom attempt'
        return ZoomPattern.patt_any_zoom.match(line)
```

FIG. 13

```
// zoom with embedded (one to 10) pans
// alternate rendering sequence first_zoom_point = { [*0:6]; "vs.enter_point(line)"; [*0:2] };
sequence pan_and_reponse_10 = { {"pp.pan(line)"; "vs.response(line)"} [*1:10] };
sequence second_zoom_point = { [*0:6]; "vs.enter_point(line)"; "vs.enter_point(line)" };

// a property that combines those sequences after a zoom cmd is started
property zoom_with_embedded_pan_prop = always "zp.start(line) -> { first_zoom_point;
pan_and_response_10; second_zoom_point };
// assertion to count zoom with embedded (one to 10) pans
zoom_with_embedded_pan: assert zoom_with_embedded_pan_prop;
```

FIG. 15

```
vunit probe (NULL) {
// 'modeling layer' . Pure Python
from vsys import VSys
from probe_cmd import ProbePattern
#from zoom_cmd import ZoomPattern
vs = VSys()
pp = ProbePattern()
#zp = ZoomPattern()

// default clocking. Pure Python expression
// clock on \a-prefixed lines only by default
//default clock = (vs.user_cmd(line) and not zp.any_zoom(line));
default clock = (vs.user_cmd(line));

// identify how many times a user first deletes all probes before
// creating a new probe and adding a net to its list of objects
del_all_add_net: assert always "pp.del_all(line)" -> next "pp.add_net(line)" ;

// identify how many times a user dds two nets to a probe in back-to-back manner
add_net_add_net: assert always "pp.add_net(line)" -> next "pp.add_net(line)" ;

```
""" Python support code for Probe pattern recognition """

class ProbePattern:
    "Probe class"
    import re
    patt_prb_add_net = re.compiler(r'\\a\s+geAddNetProbe')
    patt_prb_add_path = re.compiler(r'\\a\s+geAddPathProbe')
    patt_prb_add_term = re.compiler(r'\\a\s+geAddTermProbe')
    patt_prb_add_inst = re.compiler(r'\\a\s+geAddInstProbe')

patt_prb_del_all = re.compiler(r'\\a\s+geDeleteAllProbe')
    patt_prb_del_net = re.compiler(r'\\a\s+geDeleteNetProbe')
    patt_prb_del_inst = re.compiler(r'\\a\s+geDeleteInstProbe')
    patt_prb_del_path = re.compiler(r'\\a\s+geDeletePathProbe')
    patt_prb_del_term = re.compiler(r'\\a\s+geDeleteTermProbe')
    patt_prb_del = re.compiler(r'\\a\s+geDeleteProbe')

def add_net(self, line):
        'recognize a probe and term action'
        return ProbePattern.patt_prb_add_net.match(line)                } 1702 def add_path(self, line):
        'recognize a probe add path action'
        return ProbePattern.patt_prb_add_path.match(line)

def add_term(self, line):
        'recognize a probe add term action'
        return ProbePattern.patt_prb_add_term.match(line)

def add_inst(self, line):
        'recognize a probe add inst action'
        return ProbePattern.patt_prb_add_inst.match(line)

def del_all(self, line):
        'recognize a probe delete all action'
        return ProbePattern.patt_prb_del_all.match(line)

def del_net(self, line):
        'recognize a probe delete net action'
        return ProbePattern.patt_prb_del_net.match(line)

def del_inst(self, line):
        'recognize a probe delete inst action'
        return ProbePattern.patt_prb_del_inst.match(line)

def del_path(self, line):
        'recognize a probe delete path action'
        return ProbePattern.patt_prb_del_path.match(line)

def del_term(self, line):
        'recognize a probe delete term action'
        return ProbePattern.patt_prb_del_term.match(line)

def delp(self, line):
        'recognize a probe delete action'
        return ProbePattern.patt_prb_del.match(line)
```

FIG. 17

DATA MINING THROUGH PROPERTY CHECKS BASED UPON STRING PATTERN DETERMINATIONS

BACKGROUND

Electronic Design Automation (EDA) tools are computer software programs used to design electronic circuits. A suite of EDA tools may be used to convert a circuit design idea to a physical design including logic gates, circuit components and their interconnections. A circuit designer typically uses an EDA tool to create a schematic design of a circuit. The designer may use other EDA tools from the suite to convert the schematic to a physical layout, which specifies the shapes, positions, and dimensions of semiconductor and conductor materials such as silicon and metal. The EDA design tools can be used to in essence, translate a schematic design to a physical layout using layout rules, which specify, for example, that a particular type of transistor is to have particular dimensions and be a particular distance from other transistors in the physical layout. The physical layout can be fabricated to produce a physical implementation, which typically involves a semiconductor integrated circuit (IC) chip or printed circuit board (PCB). The integrated circuit may be an analog circuit such as an amplifier, a digital circuit such as a microprocessor, or a combination analog and digital circuit, such as a cellular telephone radio, for example.

In one approach to circuit design, a designer creates a visual representation of a circuit design on a design canvas. A design canvas typically comprises a computer generated two-dimensional interactive user interface screen display area produced with the help of an EDA tool. The EDA tool encodes a computer system to produce the user interface that allows a designer to create such a schematic diagram by adding representations of design objects, which comprise data code structures encoded in a computer readable medium that correspond to graphical icons that represent physical circuit elements such as, transistors, resistors, digital logic gates, and other devices to the design canvas. The EDA tool user interface (UI) also may allow the designer to change an existing schematic design by modifying existing design objects on the canvas, by adding new design objects to the canvas, and by modifying or adding connections between the design objects on the canvas. Connections between design objects in the schematic generally represent physical electrical connections between circuit elements of a circuit under development.

User interactions with an EDA tool UI can be complex, and there have been efforts to improve user productivity through user training and UI improvement. These efforts typically involve gathering information to identify opportunities for improving user productivity based upon how users actually interact with the EDA tool UI. In particular, log files are produced to record user interaction with the EDA tool UI. In general, a 'log file' records events that occur in a computer system. Some example events include "call", "execute", "open", "close", "wait", "fetch", "sort", "append", "run", and "delete". A log file typically comprises a text listing of events in chronological order in which the events occur in a computer system. A log file ordinarily contains information about source code but not the source code itself. Thus, different log file entries represent different configurations of a computer system used to process different user commands that a user inputs via a UI over some time frame. In practice, hundreds to thousands of session log files may be gathered for analysis.

In the past, a log miner software tool was employed to evaluate information in a log file. Often, the log miner was programmed to search for certain regular expressions that typically appear as simple strings patterns indicative of user UI interactions. A frequent 'itemset' analysis often was performed to determine which low level tool commands, error messages, diagnostics, etc., occur most frequently. Based upon this information, users could be re-trained when, for example, an analysis of user interaction with the UI indicated that users are not using some desirable new productivity-enhancing features due to being stuck in their 'old ways'. Alternatively, based upon the evaluation, the EDA tool software could be modified to better adapt it to existing use patterns (e.g. make most commonly used options available in the GUI, to hide less commonly used options or to make buttons that are often used in tandem available close together on the screen)

While frequency analysis techniques glean useful information, more complex questions require more in depth analysis to answer. For example, the following question might be posed, "how often do users attempt to do activity 'ABC', but are foiled in their attempts encountering a particular type (or types) of error message?" While it is relatively easy for us to measure how often a particular type of error message appears, it is not so easy to know when it appears in the context of activity 'ABC', as opposed to in the context of some other activity 'PQR', for example.

Moreover, line-by-line inspection of a log file entries to evaluate the occurrence of some event may be difficult since a log file text may be somewhat amorphous. For example, the question may be asked, "how often do users perform action 'XYZ'?" In some cases, action 'XYZ' may actually correspond to a contiguous sequence of low level log file entries, but in practice, these entries often are interspersed with system diagnostics, and other log file entries which are placed there for other purposes not related to this mining activity (e.g. for test replay purposes). Such entries lead to the text logs being somewhat amorphous, i.e. not as nicely structured and easily comprehensible as one would like (or even expect), making it difficult answer such questions using a simple line-by-line inspection approach.

FIGS. 1A-1G are simplified illustrative drawings representing a sequence of screen displays produced by an electronic design automation (EDA) tool user interface in response to a sequence of user input commands. In this illustrative example, the screen displays show portions of an integrated circuit design layout A02. Each rectangular region labeled 1-12 represents a different 'geographical' region of the design layout. It will be appreciated that each region may contain numerous structural details of the circuit design, which are not shown since these details are not relevant to the description. The rectangle labeled X represents a portion of the circuit design that is visible within the display screen. Thus, the rectangle X represents the screen display. In FIG. 1A, portions of regions 1, 2, 5, and 6 are visible within the screen display X. Starting with FIG. 1A, a user inputs UI commands to cause the screen display to pan downward so that regions 5, 6, 9 and 10 are visible within the screen display X as shown in FIG. 1B. Next, a user inputs UI commands to cause the screen image to pan right so that regions 6, 7, 10 and 11 are visible within the screen display X as shown in FIG. 1C. Next, the user inputs UI commands to cause regions 6 and 7 of the design to be deleted as shown in FIG. 1D. Next, the user inputs UI commands to cause regions 2 and 3 to move to the portion of the design screen display X that were emptied due to the removal of regions 6 and 7 as shown in FIG. 1E. Next, the user inputs UI commands to undo the move operation resulting in the return of regions 2 and 3 to their prior locations, as shown in FIG. 1F. Next, the user inputs UI commands to undo the delete operation to cause regions 6 and 7 to be returned to the portion of the design that they were deleted from as shown in the screen display X of FIG. 1G.

Table 1 shows an illustrative portion of a log file that may be produced for the delete, move, undo, undo operations of FIGS. 1D-1G.

TABLE 1

\a hiZoomIn( )
\i 135.01.192.62
\p >
\a addPoint(hiGetCommandPoingt( ))
\i 199.01.132.415
\r t
\t t In some embodiments, log files are created that are indicative of user interaction with the user interface to a computer system configured to implement a computer software based EDA tool. FIG. 2 shows illustrative log files that are structured into different kinds of uniquely-prefixed entries. The example EDA tool can replay a session given a log file from that session. The prefixes are used by a computer system to distinguish between different kinds of information in a log file when replaying a session from the log file information. Replaying a session is useful, for example, to reproduce a bug or to automatically test software.

Table 2 provides a description of the different types of chunk identifying entries and of the different prefixes that are associated with the different kinds of UI event entries.

TABLE 2

| Prefix | Prefix Meaning |
|---|---|
| \a | These lines reflect interactive user entries i.e. the commands invoked due to menu picks, etc. |
| \i | These lines represent additional user input (e.g. coordinates of a mouse click within a layout window) |
| \r | These lines represent system responses (typically status flags like t representing true, and nil representing False, per the 'SKILL' computer program language syntax) |
| \p | These lines represent system-generated prompts to the user |
| \o | These lines contain system-generated output/informational messages |
| \w | These lines contain system-generated warning messages |
| \e | These lines correspond to system-generated errors |
| \# | lines correspond to system-generated diagnostics (such as memory usage, etc), more generally intended for statistical mining than for user consumption |

Referring again to Table 1, log file portion (7 lines) within region shows the log file entries corresponding to a simple user Zoom in (via a 'rubberband' command). The entry, 'hiZoomIn( )' indicates that a user invokes a zoom command; the prefix '\a' indicates that the entry is an interactive user entry. The entry '135.01:192.62' indicates that a user selects (e.g. 'clicks') to establish the top left corner of the bounding box in circuit design database coordinate system of the rubberband/bounding box for the zoom; the prefix '\i' indicates that the entry is an additional user input. The entry '>' indicates a computer system prompt to the user to select (e.g. 'click') to establish the bottom right corner of the bounding box; the prefix '\p' indicates a system-generated prompt to the user. The entry 'addPoint(hiGetCommandPoint( )) indicates a user command to select (e.g. 'clicks') to furnish a bottom right corner of the bounding box; the prefix '\a' indicates that the entry is an interactive user entry. The entry '199.01:132.415' indicates that a user selects (e.g. 'clicks') to establish the bottom right corner of the bounding box in circuit design database coordinate system; the prefix '\i' indicates that the entry is an additional user input. The entries 't' represent the computer system response: the prefix '\r' indicates a system response. It will be appreciated that the entire log file portion (7 lines) may be contained within a larger overall log file information that is contained within a buffer storage device.

Log file text sequences of Table 1 could potentially be identified by comparison with 'regular expressions' such as the PCRE (Perl Compatible Regular Expressions), for example. However, in practice such expressions can turn out to be extremely long, difficult to code in a robust manner, and may contain ambiguities that can be difficult to debug. The difficulty increases when trying to code robust regular expressions ('regexps') that can handle varied interspersed warnings, prompts, user inputs, etc., within the log file. Often, the interspersed data turns out to be seemingly randomly interspersed due to asynchronous events within the computer system (related to inter-process-communication aka IPC-related activities). Sometimes information concerning such events is present in the log file, and other times it is not. In other words, there may be no easily discernable pattern to these intervening events, i.e. the pattern of events is not necessarily all that regular. Extracting useful information concerning user interaction in spite of amorphisms such as these intervening events is a challenge to mining in the log file.

Moreover, for analysis of some UI events involving user interactions/experiences with a UI, log entries relating to computer system actions (such as system response entries, or user prompt entries, or error/warning/info entries) may be irrelevant to evaluating some user actions/experiences with a UI, but may be important to evaluating other user actions/ experiences. For example, one user activity of interest may involve looking for a particular error message or warning within a particular sequence of log entries, (i.e. within a certain context). However, such error messages may be irrelevant to evaluation of other user activities, and would constitute irrelevant information or 'noise'.

SUMMARY

In one aspect, a method is provided to evaluate user interaction with a computer user interface (UI). A property definition identifies at least one a relationship among prescribed string patterns that correspond to one or more UI events. A log file in a computer readable storage device includes a plurality of respective chunks of information, and at least some of the chunks include string patterns that correspond to respective UI events. A determination is made for each of a plurality of chunks of information within the log file as to whether the chunk includes a string pattern that matches at least one of the prescribed string patterns identified within the property. A processor is configured to produce an indication of whether the property is satisfied based upon the string pattern matching determinations.

In another aspect, a system is provided that includes a machine readable storage device and a processor. The storage device is encoded with a property definition that identifies a relationship among prescribed string patterns. The processor is configured to implement a comparator that determines whether one or more string patterns within a file stored in the storage device match one or more corresponding string patterns identified within the property definition. The processor also is configured to implement a finite state machine that corresponds to the property definition to determine whether prescribed string patterns identified by the property that are determined by the comparator to match string patterns within the file have an ordered relationship among them that satisfies the relationship identified within the property definition.

BRIEF DESCRIPTION OF THE DRAWINGS

FIGS. 1A-1G are simplified illustrative drawings representing a sequence of screen displays produced by an electronic design automation (EDA) tool user interface in response to a sequence of user input commands.

FIG. 2 is an illustrative drawing of a code listing from a log that may be produced and shown in a computer user interface (UI) display for the delete, move, undo, undo operations of FIGS. 1D-1G.

FIG. 5 is an illustrative code listing from a log file that may be shown in a computer user interface (UI) display and that is indicative of user input commands and experience in connection with a computer UI.

FIG. 11 is an illustrative code listing from a property (or vunit) file showing an example data structure that stores properties encoded in a computer readable storage device in accordance with some embodiments.

FIGS. 12A-12B is an illustrative Python class code listing in accordance with some embodiments.

FIG. 13 is an illustrative code listing for an example Zoom-Pattern and PanPattern classes that are employed to provide methods that match particular zoom pattern regular expressions of interest.

FIG. 15 is an illustrative code listing showing an example hierarchical search pattern composed using PSL sequences and properties in accordance with some embodiments.

FIG. 16 is an illustrative code listing of two properties in accordance with some embodiments.

FIG. 17 is an illustrative code listing for an example of the relevant portion of the ProbePattern class in accordance with some embodiments.

DETAILED DESCRIPTION OF EMBODIMENTS

Figure 3:
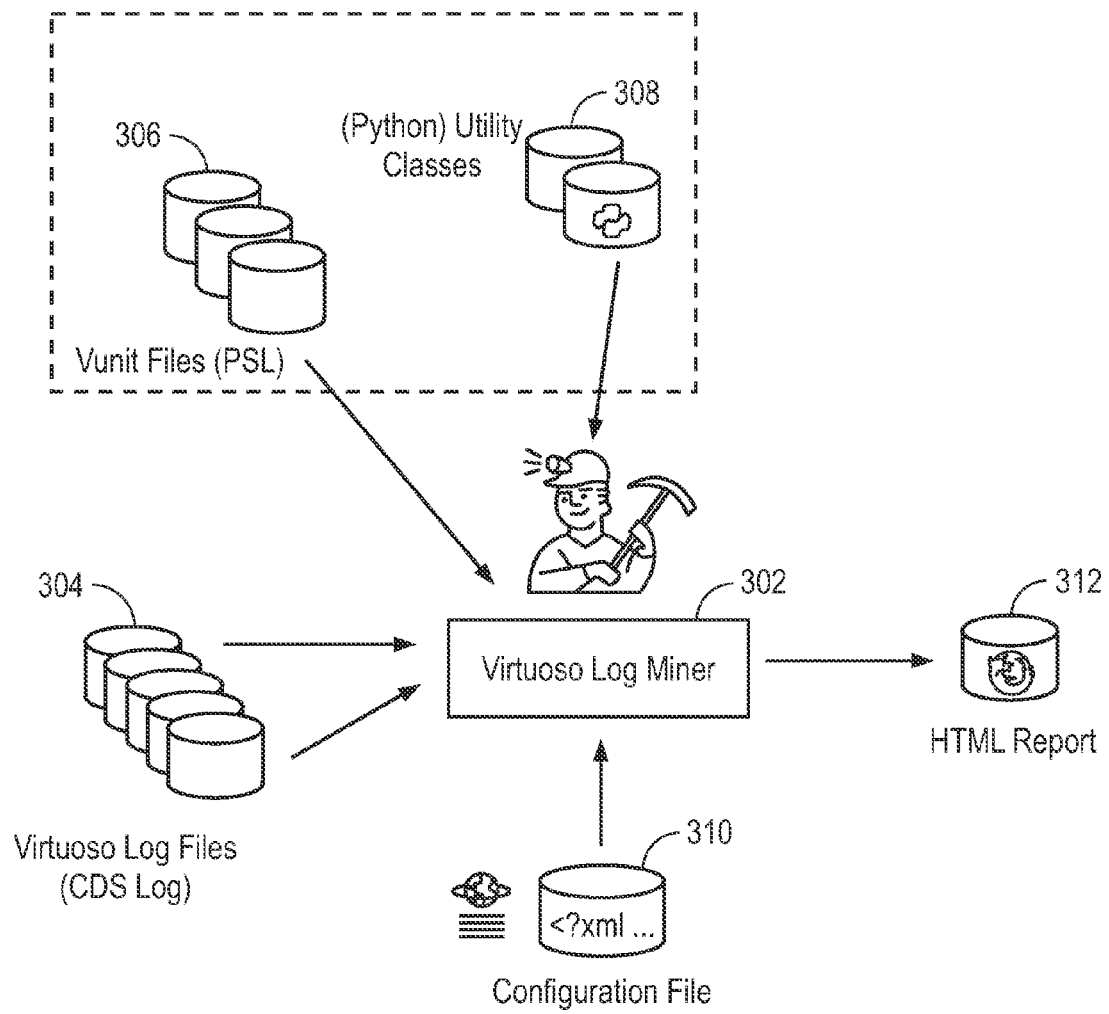
FIG. 3 is an illustrative drawing representing relationships among inputs to and output from an information processing system configured to implement a process in accordance with some embodiments.

The following description is presented to enable any person skilled in the art to create and use a computer system configuration and related method and article of manufacture to determine whether relationships among string patterns within a file satisfies one or more property relationships. In some embodiments, the string patterns correspond to code entries in a log file that represent user interface (UI) events, and the property relationships define relationships among the string patterns that correspond to relationships among UI events. Various modifications to the preferred embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art will realize that the invention might be practiced without the use of these specific details. In other instances, well-known structures and processes are shown in block diagram form in order not to obscure the description of the invention with unnecessary detail. Thus, the present invention is not intended to be limited to the embodiments shown, but is to be accorded the widest scope consistent with the principles and features disclosed herein.

Regular Expressions Detection

In accordance with some embodiments, string processing in combination with property verification is used to identify log file entries that are indicative of user interactions and experiences with a computer user interface. In computer programming, a 'string' is generally understood as a data type storing a sequence of data values, usually bytes, in which elements usually represent characters according to a character encoding. However, the data stored as strings does not necessarily represent text. In computing, a 'regular expression', often referred to as a pattern, comprises an expression that describes a set of strings. A regular expression may be used to provide a concise description of a set, without having to list all elements. Regular expressions provide a concise and flexible mechanism for matching strings of text, such as particular characters, words, or patterns of characters or words.

Property Verification

Computer program property languages have been developed to aid in formal verification of system designs. Property Specification Language (PSL) is an example of a language developed for specifying properties or assertions about hardware designs. SystemVerilog Assertions (SVA) is an example of a combined Hardware Description Language and Hardware Verification Language based on extensions to the HDL known as Verilog.

Techniques referred to as 'formal verification' have been developed to aid in the design of a system, such as an integrated circuit design. In formal verification embodiments, a 'property' comprises a collection of logical (e.g., AND, OR, NOT, etc.) and temporal relationships between and among one or more subordinate expressions, Boolean expressions, sequential expressions, and/or other properties that in the aggregate represent a set of behaviors. In the system design context, a 'design' comprises a model of a piece of hardware, described in some hardware description language (HDL). A 'design' typically involves a collection of inputs, outputs, state elements, and combinational functions that compute next state and outputs from current state and inputs. A 'design behavior' refers to a computational path for a given design.

In the system design context, the term 'verification' signifies a process of confirming that, for a given design and a given set of constraints, a property that is required to hold in that design actually does hold under those constraints. The term 'formal verification' refers to a verification process in which analysis of a design and a property yields a logical inference about whether the property holds for all behaviors of the design. If a property is declared true by a formal verification tool, no simulation can show it to be false. If the property does not hold true for all behaviors, then the formal verification process should provide a specific counterexample to the property, if possible.

Formal verification techniques have been applied to verification of designs. The 'evaluation' of a design is a process of exercising the design, typically through a simulation process in which values are iteratively applied to inputs, next state values and output values are computed, time is advanced and state values next state values and output values are assigned. The term 'checker' refers to an auxiliary process (usually constructed as a finite state machine) that monitors simulation of a design and reports errors when asserted properties do not hold. See, Douglas L. Perry and Harry D. Foster, *Applied Formal Verification*, McGraw-Hill Electronic Engineering, 2005, 5.3 Definitions, pages 72-76.

The PSL language is described in Property Specification Language 1.1, Reference Manual, Jun. 9, 2004, by Accellera. The composition of a property language such as PSL can be viewed as having distinct layers. A Boolean layer acts as a foundation that supports a temporal layer that uses Boolean expressions to specify behavior over time. A verification layer comprises directives that specify how a software tool is to use temporal layer specifications to verify functionality. A modeling layer defines the environment in which verification is to take place. In some embodiments, a modeling layer is a portion within a 'verification unit' (vunit), which is a data structure used to group verification directives and other PSL statements. In the design context, auxiliary code within a 'vunit' can be written in a standard HDL modeling language, e.g., Verilog/VHDL. The auxiliary code is evaluated by the simulator just like standard model code is evaluated, and the objects, such as circuit design objects, (and their resulting values) defined in the auxiliary code can then be referenced within the assertion properties.

The Boolean layer consists of expressions that map to true or false. In a hardware verification environment, these expressions map to conditions within the design (e.g., the state of the design, or values of inputs, or relationship among control signals). In a hardware verification environment, the temporal layer allows for the specification of time relationships and Boolean expressions that hold (i.e., evaluate to true) at various times.

Temporal operators enable the specification of complex behaviors that involve multiple conditions over time. Temporal operators can be used to specify sequences using extended regular expressions. A 'sequence' describes behavior in the form of a series of conditions that hold in succession. The verification layer specifies how the property described through Boolean and temporal layers is to be used during verification. For example, a property may be used as an assertion or as a constraint. In a hardware verification environment, an 'assertion' is a statement to the verification tool that the property is to hold and a directive to the verification tool to verify that it does hold. A 'constraint' is a condition that limits the set of behaviors to be considered. In a hardware verification environment, the modeling layer consists of HDL code to model the environment of the design. The modeling layer also is used to simplify the construction of PSL sequence properties. A verification event is a user-specified property that is satisfied at a specific time during the course of verification. A Boolean event occurs when a Boolean expression evaluates true in relation to a specified clock sample. A sequential event is satisfied at the end of a sequence of Boolean events. See, Douglas L. Perry et al., at Section 6.3, pages 83-87.

Overview of Property Verification Based Upon Regular Expression Detection

In accordance with some embodiments, a log file is produced that provides a record of information indicative of user interaction and experiences with a computer user interface. The log file comprises computer-generated symbols indicative of actual user interaction and experiences with a computer user interface.

At least one property is defined that is indicative of user interaction and/or experiences with a computer user interface. The property defines Boolean events and sequential events. The sequential events comprise a sequence of Boolean events.

A determination of whether a defined property holds for entries in a log file is made relative to a sequence of 'chunks' (e.g., lines, buffers, etc) of information from within the log file. That is, instead of time/clock cycles being the independent and advancing quantity, as in the case of hardware verification, it is the sequential ordering of these various chunks of computer-generated symbols (e.g., text) within log files that is considered independent and advancing.

More particularly, in some embodiments, a property is defined in terms of logical relationships among temporally related regular expressions. Determinations are made for a sequence of chunks as to whether one or more regular expressions defined within the property occur within individual ones of the sequence of chunks. A record (referred to herein as a 'trace') is created that indicates results of the sequence of determinations for the individual ones of the sequence of chunks for each of the one or more expressions. The record of determinations is used to evaluate whether the sequence of chunks contains information that satisfies the temporal relationship among expressions defined by the property.

Moreover it will be appreciated that defining temporal relationships among expressions serves to define an ordering among expressions based upon time of occurrence of UI events corresponding to such expressions. Alternately, ordering of expressions may be defined that may based upon different criteria such as placement of some object in some context relative to placement of some other object represented by a the same or a different expression. Thus, more generally, the principles herein apply to a property is defined in terms of logical relationships among ordered regular expressions.

In some embodiments, a finite state machine is produced that corresponds to the property. A computer system is configured to implement the finite state machine. The record of determinations (i.e., the trace) is provided to the FSM, and the FSM uses the record to determine whether the property is satisfied by information within the sequence of chunks.

Note that throughout this specification, the term 'chunk' is used to refer to contiguous computer-generated symbol data, which may be contained within a buffer storage device, for example.

Overview of System Architecture

FIG. 3 is an illustrative drawing representing relationships among inputs to and output from an information processing system 302, such as a personal computer system, configured to implement a process in accordance with some embodiments. The machine 302 receives as input information provided in log files encoded within a computer readable storage device 304 that contain information indicative of user interaction and experience with a user interface. The machine 302 receives input information from 'vunit' files within a storage device 306 that contain information concerning properties to be tested for in the log files. The machine 302 receives input information from utility class files within a storage device 308 that contain information concerning regular expressions used within the properties to be evaluated. The machine 302 receives as input information from a configuration file within a storage device 310 that is used to configure a HTML based output report. The configuration file contains a template (essentially a report skeleton) which includes major and minor section headings etc, in addition to references to one or more of the properties in the PSL storage 306. After performing an analysis of the log files, a HTML-format output report is produced which contains HTML headings and subheadings that correspond to those section headings, and HTML tables are additionally produced within each headed section containing the results/counts of the asserted properties for the properties referenced within that section. It will be appreciated that the storage devices 304-312 may comprise different portions of or locations within an overall storage system. The machine 302 provides as output a report in HTML format within a storage device 312 that indicates which of the specified properties hold for the log files. It will be appreciated that other nicely formatted human readable output formats could equally be employed, such as Office documents (MS Word, Excel, PDF), etc. without departing from the spirit of the invention. Additional computer readable output formats such as XML could equally be employed.

In some embodiments, the PSL programming language is used to specify properties, and a Python programming language extension is used to specify regular expressions used to define the properties. More specifically, the Python programming language is used as the host language for a Boolean layer expression evaluation i.e. for matching individual chunks of information (e.g., code or characters or text). Properties specified in PSL are encoded within storage 306. Utility classes implemented in Python language are encoded in storage device 308. Each class 'contains' a regular expression ('regexp') and provides a method to return a True or False value depending upon whether or not a given chunk of a log file (which is passed as an argument to the method) is matched by the regular expression contained within the class. Although the use of PSL is disclosed herein, other property specification languages such as SVA (System Verilog Assertions) could be used instead, for example. Also, although the use of Python is disclosed herein, the same approach can be applied to other programming languages used for string processing such as the Perl, Tcl, SKILL languages, for example.

Finite State Machine Creation

Figure 4:
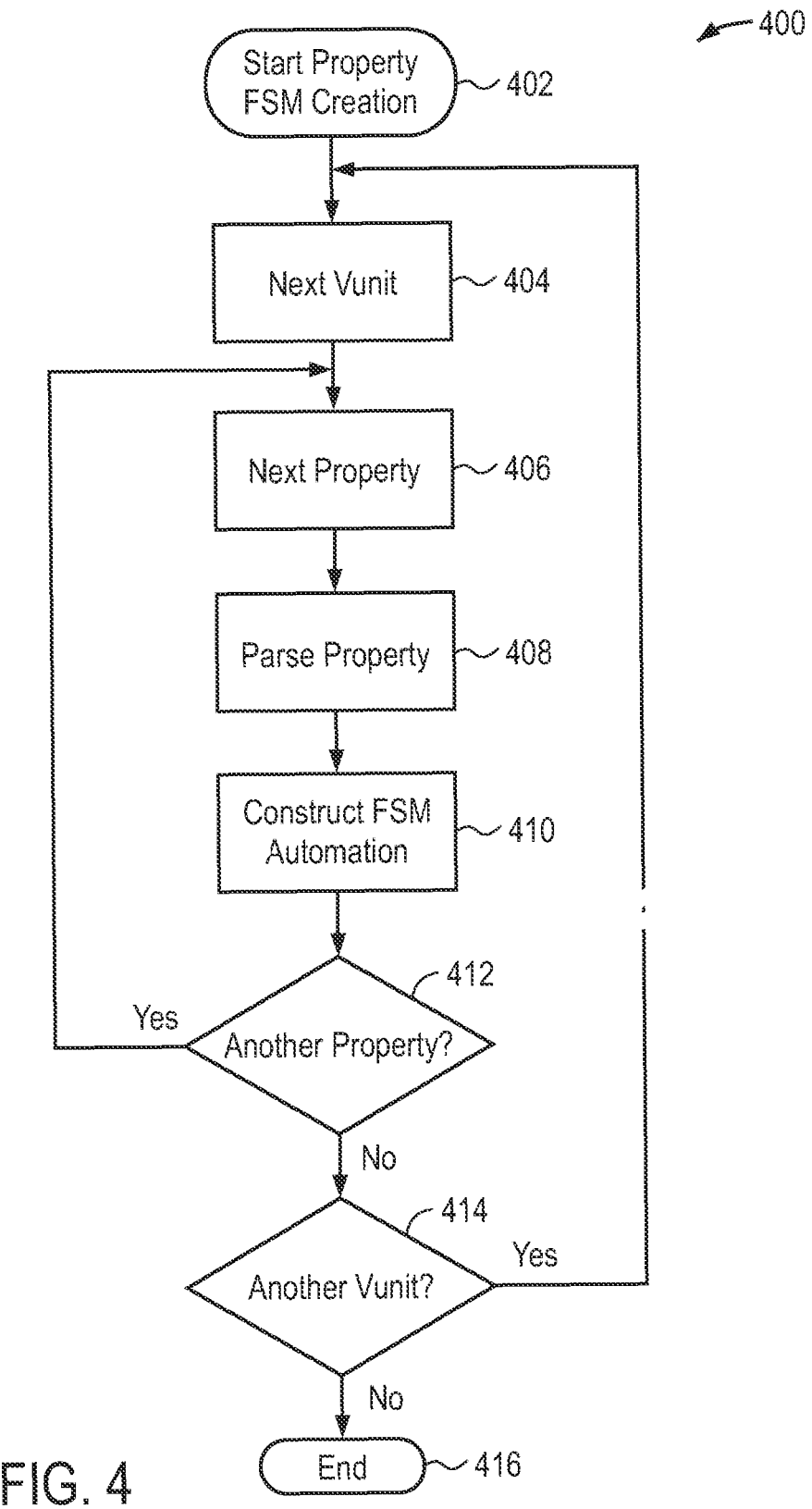
FIG. 4 is an illustrative flow diagram of a process to create a finite state machine (FSM) in accordance with some embodiments.

FIG. 4 is an illustrative flow diagram of a process 400 to create a finite state machine (FSM) in accordance with some embodiments. Each property of each vunit is parsed, and a FSM is created that can test the property against a trace of a sequence of Boolean level evaluations produced for a sequence of chunks of a log file. Each module of the flow diagram represents configuration of the machine 302 to implement the act specified for the module. The process 400 starts at module 402. Module 404 selects a next vuint for processing. Module 406 selects a next property within the currently selected vunit for processing. Module 408 parses the currently selected property. Module 410 constructs a FSM automaton for the currently selected property. Decision module 412 determines whether there is another property in the currently selected vunit that has not yet been processed. If yes, then flow moves back to module 406. If no, then flow moves to decision module 414, which determines whether there is another vunit that has not yet been processed. If yes, then flow moves back to module 404. If no, then the process 400 ends 416.

A finite-state machine (FSM) or finite-state automaton is a behavior model composed of a finite number of states, transitions between those states, and actions, similar to a flow graph to inspect how logic performs when certain conditions are met. The machine 302 is configured to implement the FSMs created by the process 400. Generally speaking, the operation of an FSM begins from a state (referred to as a start state), goes through transitions depending upon input, to different states and can end in any of those available states. However, only a certain set of states mark a successful flow of operation (referred to as accept states).

FIG. 5 is an illustrative code listing from a log file indicative of user input commands and experience in connection with a computer UI. The following Table 3 contains program pseudo-code representing a vunit containing a relatively simple property check. The property in the vunit of Table 3 will check that for any chunk/line of the UI information of FIG. 5 in which the sting pattern "hiUndo" occurs, then in the very next chunk/line of the UI information, an "\r response" string pattern occurs. The lines labeled 502 in FIG. 5 represent two such sequences of occurrences that meet the criteria of property check of Table 3. Note as indicated in Table 3, in this example, the symbol "\" signifies the start of a new chunk of information. Although in this example, each chunk consists of a line, in alternate embodiments, chunks of different sizes or dimensions or configurations may be used instead.

TABLE 3 vunit undo_example (dut) {
completed_undo : assert always ("line/chunk matches 'hiUndo'" -> next "line is a \r response" ) @ ("line/chunk starts with \ prefix");
} // v1

Figure 6:
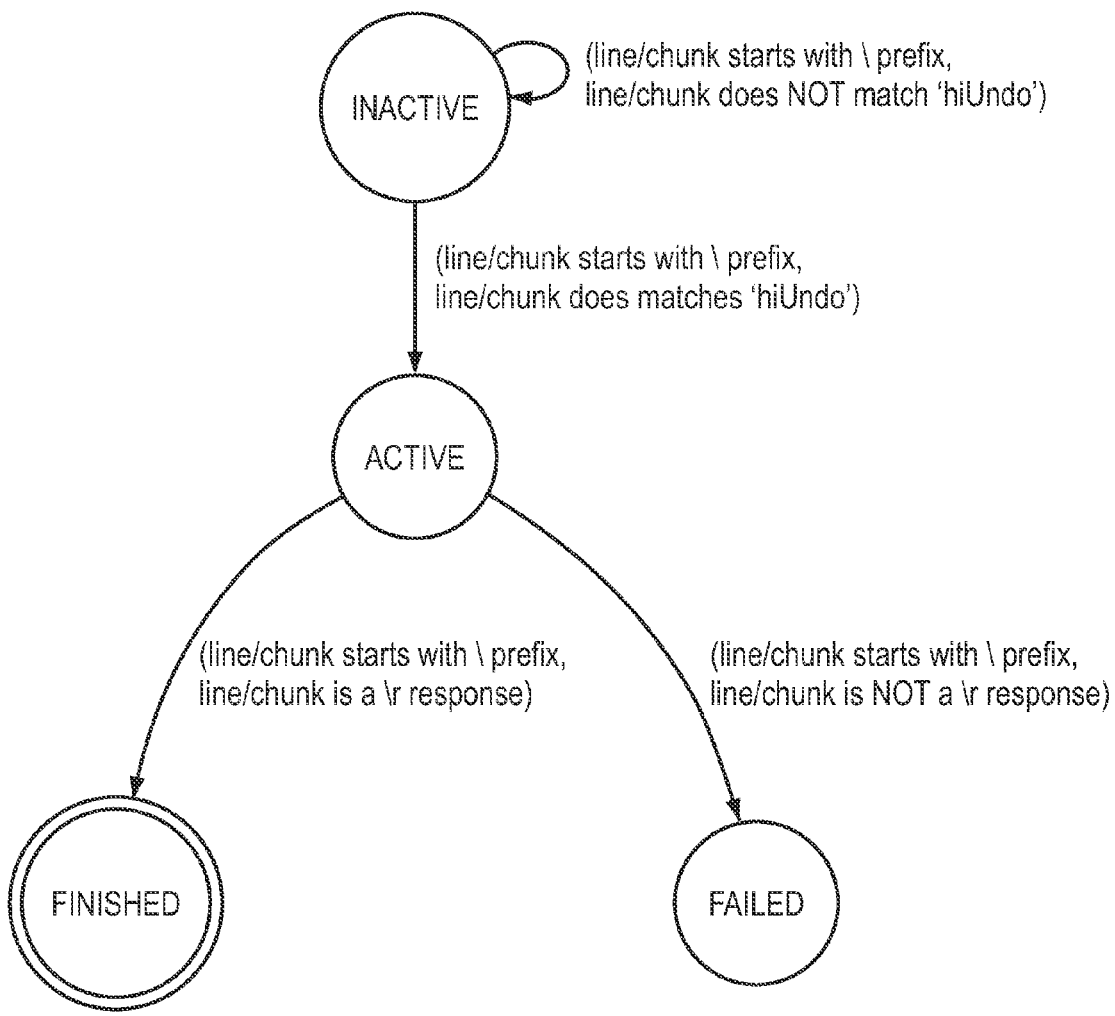
FIG. 6 is an illustrative example FSM diagram produced for an example property in accordance with some embodiments.

FIG. 6 is an illustrative FSM diagram for the example property of Table 3 produced by module 410 of FIG. 4 in accordance with some embodiments. The FSM includes four states. A first state L02 is INACTIVE, waiting for indicia of a chunk of information in the log file in which there is an occurrence of the "hiUndo" command string pattern. In this case, transition of the FSM to a second state L04, ACTIVE state occurs upon the occurrence of "hiUndo" string pattern. If the "hiUndo" command string pattern does not occur, then the FSM remains in the INACTIVE state L02. In the ACTIVE L04 state, a value of "hiUndo" was encountered, and the FSM now waits to see what happens in the next chunk of information in the log file. If the next chunk coincides with a "\r response" string pattern, then the machine transitions to the third state L06, the FINISHED state i.e. the property was successfully evaluated. If the next chunk does not coincide with "\r response", however, the FSM transitions to the fourth state L8, the FAILED state. If the FSM reaches the FINISHED state L06, then the property was successfully evaluated. If the FSM reaches the FAILED state L08, then the property was not successfully evaluated.

Figure 7:
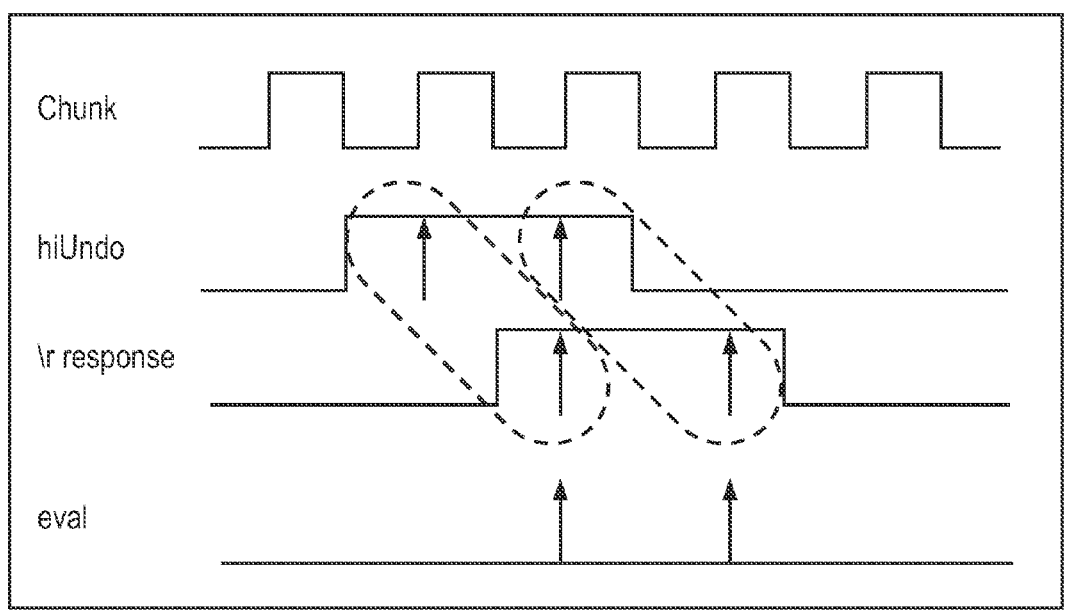
FIG. 7 is an illustrative example showing an example of output of the FSM of FIG. 6 based upon a trace showing results of evaluation of the property over time.

FIG. 7 is an illustrative example showing a graphical view of the property of Table 3 tested using the FSM of FIG. 6 against a trace of "hiUndo" string pattern and "\r response" string pattern values over time. In the example trace, a "\r response"=1 (True) value follows one information chunk after the occurrence of an "hiUndo"=1 (True). Accordingly, for both occurrences of this "hiUndo" and "\r response" sequence, the FSM L00 reaches the FINISHED state, and the property evaluates to true.

The respective traces labeled "hiUndo" and "\r response" in the illustrative trace of FIG. 7 shows a chronological ordering of indicia of string pattern matching for the "hiUndo" and "\r response" strings, respectively, in accordance with some embodiments. The trace labeled "chunk" indicates chronological occurrences of chunks to be evaluated for the occurrence of "hiUndo" and/or "\r response". The trace labeled "eval" indicates determinations by the FSM of FIG. 6 of whether the temporal relationships among the "hiUndo" and "\r response" strings satisfy the property checked by such FSM.

Figure 8:
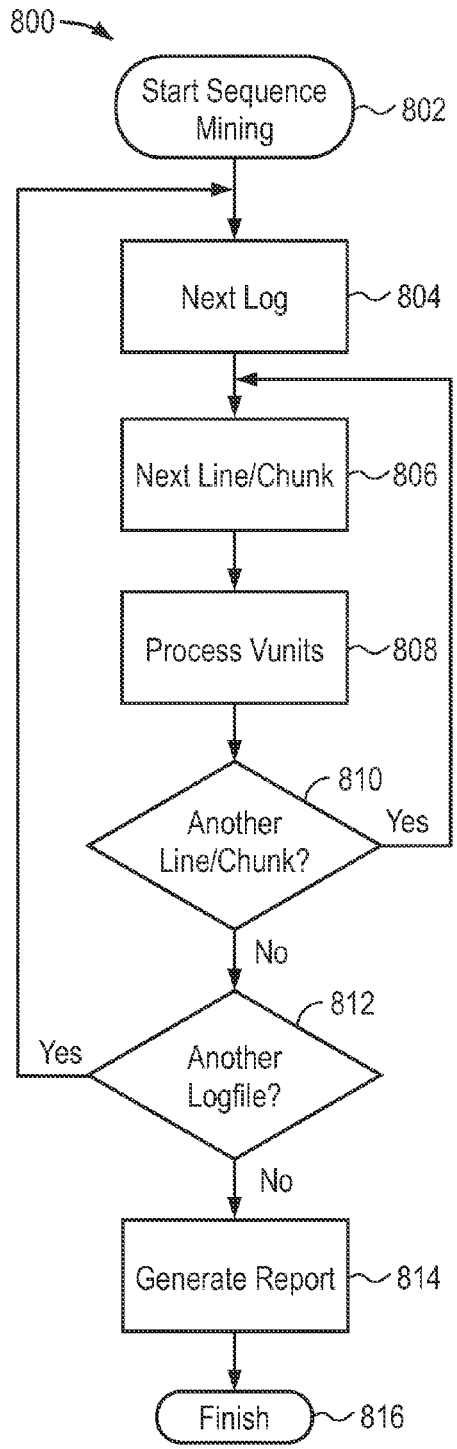
FIG. 8 is an illustrative flow diagram representing an overall process to identify sequences within a log file in accordance with some embodiments.
Figure 9:
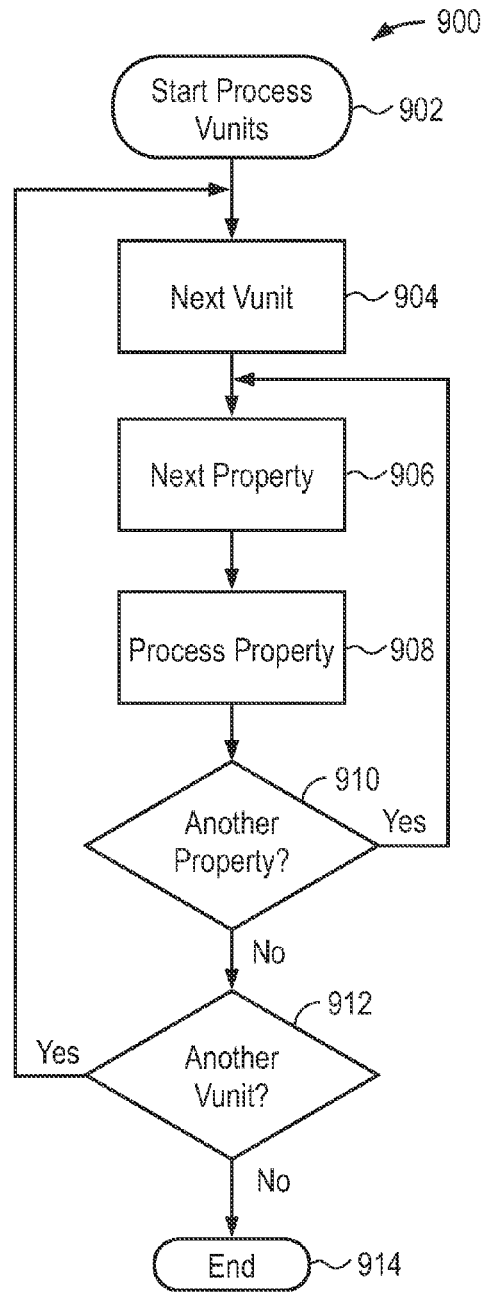
FIG. 9 is an illustrative flow diagram representing a process to evaluate verification units referenced within the process of FIG. 8 in accordance with some embodiments.
Figure 10:
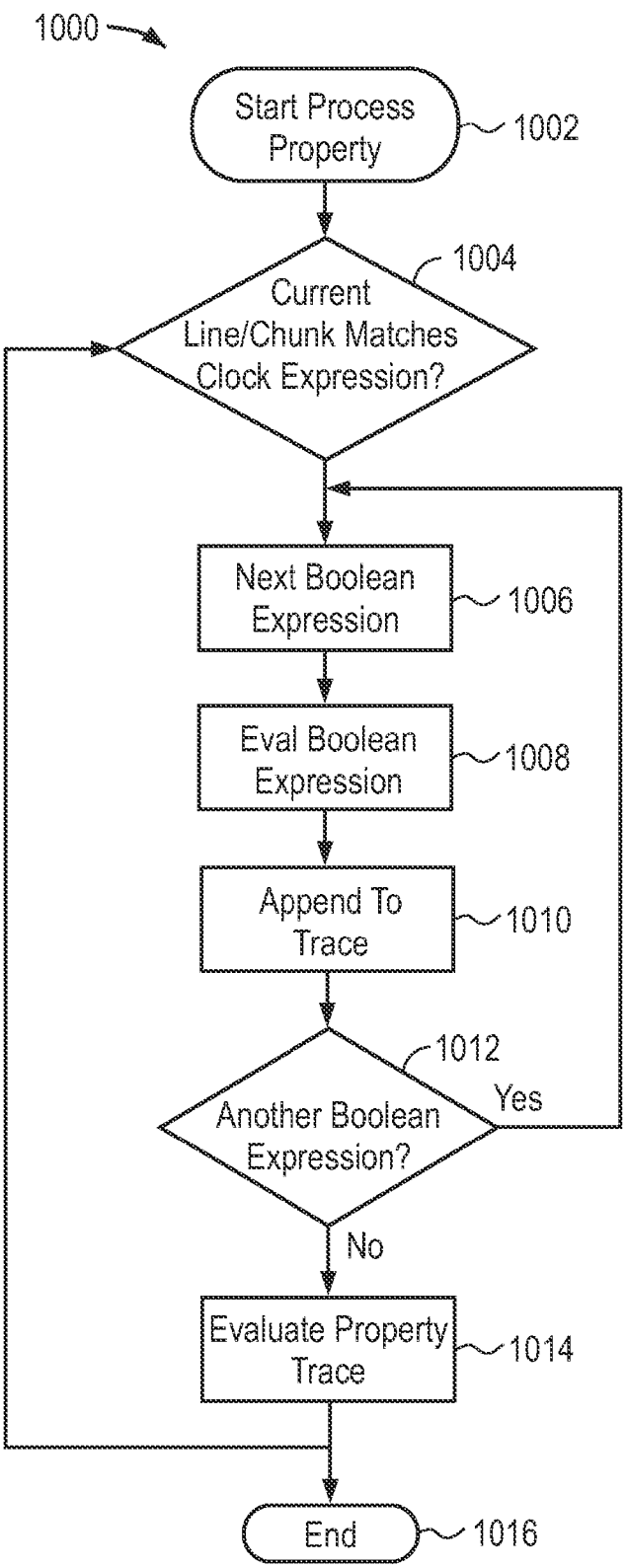
FIG. 10 is an illustrative flow diagram representing a process to use Boolean expressions within properties of the verification units of FIG. 9 to evaluate content within a log file in accordance with some embodiments.

FIGS. 8-10 are illustrative flow diagrams representing different levels of log file processing in accordance with some embodiments. Each module of the flow diagrams of FIGS. 8-10 represents configuration of the machine 302 to implement the act specified for the module. FIG. 8 is an illustrative flow diagram representing an overall process 800 to identify sequences within a log file in accordance with some embodiments. The overall process 800 involves iterating over each chunk of each log file, and processing that chunk with respect to each of the vunits (each of which typically includes a group of related properties). A report is generated at the end of the overall process. FIG. 9 is an illustrative flow diagram representing a process 900 to evaluate vunits in accordance with some embodiments. The vunit evaluation process 900 processing involves iterating over each property of each vunit, for each chunk of each log file. FIG. 10 is an illustrative flow diagram representing a process 1000 to use Boolean expressions within properties of the vunits of FIG. 9 to evaluate content within a log file.

Referring to FIG. 8, the overall process 800 starts with module N02. Module 804 selects a next log file to be evaluated. Module 806 selects a next chunk for evaluation within the currently selected log file. As used herein, the term 'chunk' refers to a unit of information such as a line within a log file or some prescribed buffer device contents that that is to be evaluated according to one or more Boolean evaluations defined within a property. A log file comprises a plurality of chunks, and each chunk is individually evaluated according to the Boolean evaluations. Module 808 processes vunits associated the currently selected chunk. As explained above, a vunit comprises an information structure that stores information indicative of one or more properties. Decision module 810 determines whether there is another chunk within the currently selected log file to be evaluated. If yes, then flow moves back to module 806. If no, then flow moves to decision module 812, which determines whether there is another log file to be evaluated. If yes, then flow moves back to module 804. If no, then flow flows to finish 816.

The flow diagram of FIG. 9 illustrates process 900 involving details of operation of module 808 of FIG. 8 in accordance with some embodiments. Process 900 starts with module 902. Module 904 selects a next vunit associated with the chunk to be processed next according to module 806 of FIG. 8. Module 906 selects a next property to be evaluated from within the currently selected vunit. Module 908 processes the currently selected property. Decision module 910 determines whether there is another property from within the currently selected vunit to be processed. If yes, then flow moves back to module 906. If no, flow moves to decision module 912, and a determination is made as to whether there is another vunit to be processed. If yes, as to module 912, then flow moves back to module 904. If no as to module 912, then process 900 ends 914.

The flow diagram of FIG. 10 illustrates process 1000 involving details of operation of module 908 of FIG. 9 in accordance with some embodiments. Process 1000 starts with module 1002. Decision module 1004 determines whether there is a currently selected log file chunk is to be evaluated for one or more properties. A log file may include a variety of kinds of content, and only some of this content may be relevant to properties to be evaluated. Accordingly, process 1000 involves an initial determination of whether content within the chunk currently selected by module 806 of FIG. 8 qualifies as the kind of content that is to be evaluated using Boolean expressions. The determination filters log file content based upon indicia of whether the content is the kind of content to be evaluated using a Boolean expression from a property. In some embodiments, the chunk identifying indicia comprise text prefixes associated with a chunk set forth in Table 2.

If decision module 1004 determines yes, (i.e. the current chunk is to be evaluated) then module 1006 selects a next Boolean expression in the property currently selected by module 906 of FIG. 9 of the vunit currently selected by module 904 of FIG. 9). More particularly, module 1006 selects a next Boolean expression in the current property under evaluation. Module 1008 processes the currently selected Boolean expression. That is, the currently selected chunk is evaluated to determine whether it contains a match with the currently selected Boolean expression. If the current chunk contains a match that corresponds to the currently selected Boolean term, then processing returns a True. If the current chunk does not contain a match that corresponds to the currently selected Boolean term, then processing returns a False. Module 1010 appends results (i.e. a True/False) of the processing of the currently selected Boolean expression to a data structure encoded in a computer readable storage device referred to as a 'trace' data structure, which over the course of several iterations of the process of FIG. 10, grows to provide a sequence of True/False (matching/not matching) results. The sequence of results corresponds to the chronological Boolean evaluation of chunks within the file.

Decision module 1012 determines whether there is another Boolean expression in the currently selected property of the currently selected vunit. If yes, then flow moves back to module 1006. If no, then module 1014 evaluates the property based upon the sequence of evaluation results within the trace data structure, i.e. the True/False sequence, using a FSM created according to the process 400 of FIG. 4. The process 1000 then ends.

Referring again to decision module 1004, if a determination is made that the current chunk is not associated with indicia that indicate that it is to be evaluated, then the process 1000 ends at module 1016.

Referring again to module 1006, a Boolean expression may correspond to any of the types of chunk identifying entries indicated in Table 2, for example. In some embodiments, a host language, such as Python, is used to perform a textual analysis of the entries within the currently selected chunk, where this analysis typically involves string or regular expression matching operations (using for example PCRE expressions mentioned above). In a current embodiment, a Python program reads the log file chunk, and places the contents of a current chunk in a variable called 'line'. It then makes an (evaluation) 'eval' call to evaluate the chunk which returns T/F. In a current embodiment, the 'eval' call is a call to a class method to evaluate the regexp against the string to see if it matches. However, the processing can be as exotic as is required, complex conditional checks can be performed.

It will be appreciated that a processor configured to perform the process of the process of FIG. 9 determines which properties are associated with a chunk of information. It will be appreciated that circuitry of the processor is configured to implement a comparator to perform the process of FIG. 10 that determines whether one or more string patterns within the chunk of information within a log file match one or more corresponding prescribed string patterns identified within a property expression and whether a relationship among the string patterns determined to match satisfies relationships defined by the property. Moreover, it will be appreciated that circuitry of the processor is configured to implement a FSM defined according to the process of FIG. 4, to determine whether a relationship among the string satisfies relationships defined by the property. It will be further appreciated, of course, that the configuring of circuitry of the processor to implement a given FSM may last only as long as required to make the determination required of that given FSM.

EXAMPLES

FIG. 11 is an illustrative drawing of a screen display representing a data structure that stores properties encoded in a computer readable storage device in accordance with some embodiments. The data structure comprises a vunit that defines properties that correspond to user behaviors and experiences associated with user interaction with a user interface. The properties illustrated in FIG. 11 are coded in PSL, using PSL syntax such as the implication operator '→', sequences bounded by curly braces { }, semi-colons indicating 'next chunk/sample point', etc. PSL semantics are associated with those syntax items, e.g. A→next B means that after event A occurs, the very next chunk sample means event B must occur. In the case of log mining using the software tool, for example, that means that when a chunk, e.g., a line, that matches an indicia (e.g., an expression) of a next chunk of code and that also matches the regular expression referenced by A occurs, the very next line that also matches the indicia of a next chunk to be evaluated must also match the expression referenced by B, for example.

Table 4 is an illustrative drawing showing example results of running the above vunit 'script' of FIG. 11 on a number of software tool log files (not shown).

TABLE 4 cat-central+cadence+com+ src{75} !py
python /home/riordan/python/log_miner_dp/src/
sequence_psl+py –f ~/tm/zoom_logs+
txt –v /home/riordan/python/log_miner_dp/src/zoom+psl

| Name | Finished | Failed |
|---|---|---|
| started_zoom | 7 | 0 |
| completed_zoom | 5 | 2 |
| abortable_zoom | 5 | 0 |
| cancelled_zoom | 2 | 5 |
| zoom_with-single-pan | 0 | 6 |
| zoom_with_dual_pan | 1 | 5 |
| zoom_with_embedded_pan | 1 | 5 | cat-central+cadence+com+ src {76} ■

Some of the user activities were successfully started and finished as indicated in the 'Finished' column), which is of primary interest. The 'Failed' column count corresponds to activities that appeared to have started, but 'diverged' to end up as some other activity.

Referring again to FIG. 11, the beginning and ending braced lines are 'boilerplate' code corresponding to the beginning/end respectively of a PSL vunit specification. The lines of code indicated as 1102 would commonly occur in the 'modeling layer' of a vunit when applied to the hardware verification problem. Instead of containing HDL code however, the modeling layer consists of code that configures a computer system to search for symbol patterns (e.g., text patterns) within the log file. In some embodiments, the modeling layer code comprises code in the Python computer language.

Referring to Table 5, there is shown an illustrative example portion of code portion from a log file used to import and instantiate certain utility classes from Python code modules in accordance with some embodiments.

TABLE 5 vunit zoom (NULL) {
// 'modeling layer'. Pure Python
from vsys import VSys
from zoom_cmd import ZoomPattern, PanPattern
vs = VSys( )
zp = ZoomPattern( )
pp = PanPattern( )
// default clocking. Pure Python expression
default clock = (vs.any_line(line));
// property to define a completed zoom command.
// This is a hybrid of PSL and Python expressions//
zooms that the user attempted, may have cancelled or not
    started_zoom: assert always "zp.start(line)" abort "not zp.start(line)";

Methods associated with the modules of Table 5 are used to determine whether a given log file chunk contains matches with types of regular expressions of interest. Calls to imported class modules are used to keep a clean Python modular code arrangement, but in fact the corresponding classes and their regular expressions could equally have been inserted directly inline as opposed to importing them.

Referring to Table 6, there is shown an illustrative example portion of code portion from a log file used to define indicia of a default chunk of information (e.g. code) that acts as a 'clocking expression' using PSL 'clocking expression' syntax, except that here the expression between the outer parentheses is a call to the 'any_line( )' method of the instance 'vs' of the Vsys class. (The full Vsys class code listing is given in FIGS. 12A-12B).

TABLE 6

// default clocking. Pure Python expression
default clock = (vs.any_line(line));

It will be appreciated that in typical Verilog/VHDL cases, a clocking expression comprises Verilog/VHDL code that references logic signals within a circuit description. However, in embodiments herein, a call is made to code (e.g., Python code) to configure a computer to evaluate symbol patterns within a log file and to return a Boolean value indicative of a match/no match with a regular expression. Specifically, the called code configures a computer system to evaluate a regular expression against a chunk of a log file to see if it matches. Specifically, for example, in some embodiments, a Python callable method that in this cases returns true if the contents of the specified log file line contains any of the \a, \i, \r, \p \o, \w, \e, or \#prefixes i.e. any log line recorded based upon operation of the computer program tool will return a match. As for the more traditional PSL applications, any property without an explicit clocking expression will be evaluated in the context of the default clocking expression.

Referring to Table 7, there is shown an example user activity/property of interest, which is coded as a PSL assertion.

TABLE 7 started_zoom: assert always "zp.start(line)" abort "notzp.start(line)";

The code in Table 7 that begins with a colon-terminated label (i.e., 'assert always "zp.start(line)" abort "notzp.start(line)";') is a PSL expression, containing the verification and temporal layer components (i.e., ': assert always' and 'abort') and the Boolean layer terms that contain code in a language (e.g., Python expressions) (i.e., "'zp.start(line)'" and "'notzp.start(line)'") used for symbol pattern matching. In some embodiments, each of the Boolean layer terms is evaluated by a Python engine that evaluates the given expression such as, "'zp.start(line)'", within the context of each line of a log file which also matches the chunk identifying expression identified previously in the log file line/chunk. Thus, only chunks of log file that match a chunk identifying expression (sometimes referred to herein as a "clock expression") are considered for the Boolean expression evaluations. Lines which do not match are ignored. Lines for which there is a chunk identifying expression match are evaluated to determine whether they further match the patterns referenced by the Boolean layer expressions. FSM state is updated for those log file line/chunks for which the chunk identifying expression evaluates to true (similar to the VHDL, Verilog case).

Therefore, it will be appreciated that PSL 'clocking expressions' are applied to log file chunks instead of the usual clock events in a HDL simulator (which was the original application of PSL). For a given property, only chunks that contain a match to the explicit 'clocking expression' (if given), or the default clocking expression (if no explicit expression given) are considered when evaluating the Boolean terms. Other chunks are skipped. Thus, a clean mechanism is provided for selectively ignoring particular types of lines/chunks on a per-property basis, and for avoiding any issues associated with global pre-processing data-cleaning steps. Rather than undertake a global pre-processing to remove lines/chunks from log files before feeding them to a mining tool, the log files are kept fully intact, and a clocking expression allows each PSL property to perform its own cleaning on the fly as lines/chunks which do not match are not considered. Such consideration is done advantageously on a per-property basis allowing for more specificity, i.e., not on a global pre-processing basis.

In some embodiments, expressions (e.g., "zp.start(line)" and "not zp.start(line)") designated within a property are evaluated using a Python code engine to determine whether there is a match with symbols within a log file. For any line for which the clocking expression comparison evaluates to True, (e.g., there is a match), the resulting Boolean values (evaluation of expressions such as "zp.start(line)") are combined in a binary trace for evaluation against a property expressed in the PSL language. In other words, the logical 1's and 0's (Trues and Falses) corresponding to the Boolean expression evaluation results are concatenated, and a PSL/SVA FSM evaluator is then invoked on these traces (with a new trace produced for each line/chunk of input for which the clocking expression evaluates to True) in order to determine whether the given PSL/SVA overall property passes/fails, etc.

The Table 7 example, 'started_zoom' assertion configures the computer system to count how many times the zp.start( ) method returned true for log file entries, where the zp.start( ) method, a method of the ZoomPattern class (see FIG. 13 for a full listing of this class), returns true if the given line matches a UI zoom command. Specifically, it has been coded to return true if the following regexp is matched: ^\\a\s+ hiZoomIn. This regexp will match any line that starts with (^) a literal backslash (\\) followed by zero or more occurrences of white space (\s+) followed by the literal value hiZoomIn. The corresponding regular expression is labeled 1302 in the code listing for FIG. 13.

Table 8 (which contains an excerpt from FIG. 11) shows illustrative example property assertion for a more complicated zoom sequence.

TABLE 8 completed_zoom: assert always "zp.start(line)" -> {[*0:6]; "vs.enter_point(line)"; [*0:6]; "vs.enter_point(line)" ; "vs.response(line)" };

In the Table 8 example, implementing the property assertion involves configuring the computer system to search/count only zoom commands that were fully completed by the user, i.e. not aborted in any way. Since no explicit clocking expression is given, the Boolean terms (i.e., "zp.start(line)" 0:6 and "vs.enter_point(line)" 0:6 and "vs.enter_point(line)" and "vs.response(line)") (i.e. the Python expressions) in this property are evaluated any time the default chunk identifying (clock) expression matches the current log file input line. In other words, if the current log file input line/chunk matches the regular expression referenced within the symbol pattern matching (i.e. Python) code for the chunk identifying (clock) expression, it is further considered to determine whether it also matches the regular expressions referenced within the Boolean layer expressions. In this example, the [default] clocking expression is 'vs.any_line(line)', which is a call to a Python class method which returns T/F. Hence, all lines/chunks within the log file will be considered, and tested next to see if zp.start(line) is true, and if vs.enter_point(line) is true, and if vs.response(line) is true.)

Further, the PSL implication→operator is used to start a search any time the zp.start(line) (symbol pattern match) method (i.e a Python method) returns true, i.e. any time the current logfile line matches a hiZoomIn command. Once a corresponding such sequence start line has been identified, a determination is made as to whether the text sequence indicates a sequence involving a user clicking to enter a zoom rectangle start point and end point pair (where these can happen anywhere within a six (6) line window of the starting line and each other respectively), followed by a system response line indicating the zoom command has been successfully conducted by the software. The [*0:6] entry in this example was coded to provide a little 'slack' in the pattern identification system in order to accommodate some interleaved warnings/errors etc.

Referring again to Table 4, the "Finished" column in the results of running the analysis on a sample set of (short) logs, we see that the user 'started_zoom' operations a total of seven (7) times, but only completed_zoom operations five (5) times. As it will turn out, the difference corresponds to two (2) cancelled_zoom operations (where the user canceled the zoom operation before specifying the second rubberband rectangle with the mouse). Looking a little more closely at the results, we can also see that the five (5) completed zoom operations must also includes a single match for a 'zoom_with_dual_pan' operation, and another single match for a 'zoom_with_embedded_pan' operation.

Table 9 shows illustrative example in which the computer system is trained to recognize a user-cancelled zoom operation.

TABLE 9

// zooms that were started, but cancelled before finishing
cancelled_zoom: assert always ("zp.start(line)" -> next
("vs.user_cancel(line)"
before "vs.response(line)")) @("vs.user_cmd(line)");

In the Table 9 example, the PSL semantics are used to search for a user cancellation (the Python "vs.user_cancel (line)" expression will return 'True') happening before a valid system response line, all of that being predicated by a zp.start (line) i.e. zoom start operation. That is, the system is being programmed to look for instances where a zoom command is started, and starting with the very next line for which the clocking expression holds, a user cancellation occurs some time before a system response occurs.

We also note how this example contains an explicit clocking expression, @("vs.user_cmd(line)"); Here, the Boolean terms (Python expressions) are evaluated for any log file line for which vs.user_cmd(line) returns true. Note that this is actually different from the default chunk identifying (clock) expression that would have been applied otherwise. The user_cmd( ) method of the Vsys class returns 'True' only when the specified log file line is an actual user command i.e. is a \a-prefixed line. Unlike the default 'clocking expression' case, it does not return true for any of the other prefixes. This example shows how selective clocking allows only lines of a given type to be considered, while other types of lines are ignored. Such a scheme makes it easy to code up patterns for user experiences that can happen in the presence of, or in the absence of, additional 'noise' such as intermittent warnings, etc.

Nested Sequences

The code listing of Table 10 shows illustrative example property assertion used to search for a click-to-enter-point (vs.enter_point(line)) that occurs within six (6) sampled lines of a zoom start operation, which is then followed within two (2) lines by a pan operation (pp.pan(line)), and its response, which is itself followed within two (2) lines by another pan, then a system response to that pan, then the second click to enter point, and finally the system response to that which completes the zoom.

TABLE 10

Figure 14:
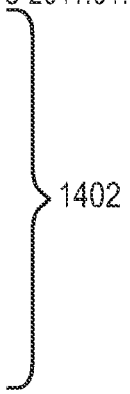
FIG. 14 is an illustrative code listing from a log file indicative of user input commands and experience in connection with a computer UI.

// zoom with embedded dual pan operation
zoom_with_dual_pan: assert always "zp.start(line)" -> { [*0:6];
"vs.enter_point(line)" ; [*0:2] ; "pp.pan(line)"; "vs.response(line)";
"pp.pan(line)";
"vs.response(line)" ; [*0:2] ; "vs.enter_point(line)"; "vs.response(line)" };

The code listing of FIG. 14 shows an illustrative example log file pattern that matches the property assertion of Table 10. Specifically, the lines labeled 1402 in FIG. 14 match the zoom with dual pan property of Table 10.

The code listing of Table 11 shows illustrative example property assertion that is similar to that of Table 10 but contains a PSL term [*:1:10].

TABLE 11

// zoom with embedded (one to 10) pans
zoom_with_embedded_pan: assert always "zp.start(line)" -> { [*0:6];
"vs.enter_point(line)" ; [*0:2] ; {{"pp.pan(line)";
"vs.response(line)"}[*1:10]};
[*0:6] ; "vs.enter_point(line)"; "vs.response(line)" };

This means that the sub-sequence contained within the preceding pair of curly braces can repeat anywhere from 1 to 10 times. The example property assertion of Table 11, is somewhat more general than the example property assertion of Table 10, which expects to find a line that matches a pan, followed by a line that matches a system response, followed by another pan, followed by another response, soon to be followed by an enter point. That is exactly two (2) pan/response pairs, in succession, before the enter_point. With the example property assertion of Table 11, however, the first pan/response pair can be followed by any number of pan/response pairs within the range 1-10. If more than ten (10) pan/response pairs follow, there will not be a match. If between 1-10 pairs follow the first, it will be considered to be a match. The property assertion of Table 10, therefore, is therefore more restrictive than that of Table 11, which will match any sequence of 1 to 10 pan operations when they are nested within a zoom operation.

Hierarchical Searches for Symbol Patterns

PSL sequences and properties also can be advantageously used to compose search patterns in a hierarchical manner as shown in the illustrative code portion of FIG. 15. In this example, three sequences are first defined. These three sequences then combined to create the property to be checked for. The property is referenced in an assert statement in order for it to be counted by the system. This approach (combined with the textual sequence analysis presented here) makes it easier to assemble complex text pattern matching sequences, and to re-use previously composed identification patterns for common sub-sequences in new higher order sequences. Complex and nested commands corresponding to very long (in terms of lines of log file entries) user operations can thus be easily composed in hierarchical manner.

Referring to FIG. 16, a vunit named 'probe' contains two properties. The first property, 'del_all_add_net' case corresponds to an example software tool user interface first deleting all items in the current probe set, and then immediately (next user command) adding a net item to the probe set (net probes in the tool correspond to highlighting schematic or layout database objects that share a common connectivity or underlying electrical signal). The second property 'add_net_add_net' corresponds to a user action of adding a net object to the probe set immediately after adding a prior net object to the probe set.

Counts for these properties allow us to determine how often a user probes two different nets in a back-to-back manner, compared to (say, not shown as coded here) how often a user probes first a single net, and then proceeds to probe an instance object (which itself may contain a bundle of such nets) or some other type of object. For example, if we know that users very commonly probes two nets in succession, then we can modify the software UI to react in a 'smart' manner, e.g. as soon as the user has probed his first net, we can immediately highlight the rest of the nets in the design to make it easier for the user to find his next net to probe. In addition, we could modify the UI to de-highlight other types of objects to remove some clutter, thus improving the user experience for a majority of users. However, if for example, users have a much higher probability to first probe a net, and then to immediately probe an instance, we could modify the UI to highlight the instances instead as soon as the user has probed a net, in order to make it easier to find the instances for the subsequent probe.

Note that for illustration/comparison purposes: the probe properties have a chunk identifying (clock) expression of vs.user_cmd(line), labeled EE02 in FIGS. 12A-12B, which has been coded to only match log file entries corresponding to user commands (\a prefixed only), whereas the zoom command properties as described before have a more generous clocking expression (see default clock statement in FIG. 11) which matches all log file line prefix types (i.e. vs.any_line( )). It will be appreciated that this is a form of the per-property cleaning. The probe properties only consider lines that match user commands. Any other types of log file entries occurring between the del_all and add_net commands are simply never considered. Since the system response lines in particular are not considered, then any failed attempts to probe objects (e.g. user tries to probe a non-probable object such as a text label) will still be included in the final report counts. The zoom properties on the other hand are also checking for valid system response lines. User zoom sequences that fail for some reason (e.g. user fails to draw the bottom right coordinate of the zoom box meaning the system response is a failure) would therefore not be counted. The probe counts are, therefore, more correctly classified as probe attempts, whereas the zoom counts are more correctly classified as successfully completed zoom operations. Since counting attempts does not care about the presence or absence of response lines within the log file, they, therefore can be 'clocked' differently. Assume for example, that a log miner is run over both the zoom vunit described earlier with reference to FIG. 11 and the probe vunit of FIG. 16. Each property is tested in the context of its own clocking expression (i.e. far more lines/chunks of code are processed in the context of the zoom commands than are processed in the context of the probe commands).

Assume further that the report of Table 12 is produced as a result of this run.

TABLE 12 cat-central₊cadence₊com⁺ BRCM{86} python
/home/riordan/python/log_miner_dp/src/sequence₊psl₊py −v
/home/riordan/python/log_miner_dp/src/probe₊psl −v
/home/riordan/python/log_miner_dp/src/zoom₊psl −f some_logs₊txt

| Name | Finished | Failed |
|---|---|---|
| del_all_add_net | 1 | 5 |
| add_net_add_net | 0 | 11 |
| started_zoom | 2721 | 0 |
| completed_zoom | 2196 | 28 |
| abortable_zoom | 2194 | 20 |
| cancelled_zoom | 1 | 30 |
| zoom_with_single_pan | 0 | 31 |
| zoom_with_dual_pan | 0 | 31 |
| zoom_with_embedded_pan | 0 | 31 | cat-central₊cadence₊com⁺ BRCM {87} ▮

Here we see a fairly well known phenomenon at work which is that large numbers of zoom operations are typically performed by tool users. The target set of logs here corresponded to only ten (10) tool sessions, yet yielded many started zoom commands, with only one fully finished occurrence of the 'del_all_add_net' property. This is because the chip designs are incredibly large and complex, and in order see any design objects (wires, etc) at the necessary level of detail in order to be able to manipulate them, the user has to zoom in. Think of drawing a detailed map of the entire United States, where you need to put an X to mark every house on every street of every town of every state. You would spend forever and a day zooming in and out. Similarly, software UI developers, want to know the exact ratio of zoom commands to other actual data editing commands, etc., and track those over time, across a swath of users. Making the UI software more intelligent (e.g., figure out what a user will do next, and zoom automatically for her once in a while so that she does not have to do it herself), can improve user experience.

Table 13 is an illustrative report showing example results of running the log file miner on a somewhat larger sampling of user logs. Again, the ubiquitous large counts of zoom sequences show up.

TABLE 13 cat-central₊cadence₊com⁺ BRCM{87} python
/home/riordan/python/log_miner_dp/src/sequence₊psl₊py −v
/home/riordan/python/log_miner_dp/src/probe₊psl −v TABLE 13-continued /home/riordan/python/log_miner_dp/src/zoom₊psl −f user_logs₊txt

| Name | Finished | Failed |
|---|---|---|
| del_all_add_net | 82 | 68 |
| add_net_add_net | 5 | 125 |
| started_zoom | 36919 | 0 |
| completed_zoom | 32725 | 273 |
| abortable_zoom | 32696 | 272 |
| cancelled_zoom | 107 | 363 |
| zoom_with_single_pan | 0 | 367 |
| zoom_with_dual_pan | 0 | 367 |
| zoom_with_embedded_pan | 0 | 367 |

APPENDIX

Utility Classes

The Vsys class contains methods (Python class 'methods') that can identify common example 'system-specific' patterns, such as patterns that match the \a, \i, \r, \p \o, \w, \e, \#prefixed lines described previously. It also contains for convenience some methods that combine these e.g. patterns such as user_input_or_response(line) which will return true if the line matches either a user-input (\i-prefixed) or system-response (\r-prefixed) line. These methods rely heavily upon the PCRE-compatible Python re package relevant class constructor. Illustrative Code for the Vsys class (that corresponds to the 'vs' instance within the vunit code) is shown in FIGS. 12A-12B. The notation 'vs' indicates a concrete instance of the VSys class (classes are like templates, they need concrete instantiation in an object oriented program in order to be able to do anything useful). FIG. 16 shows a vunit code which references 'vs' in a clocking expression. The 'vs' instance has all of the methods provided in FIGS. 12A-12B. Hence the clocking expression can refer to vs.mouse_add_point(line), or vs.enter_point(line), etc. It will be appreciated that this is conventional object oriented programming.

FIG. 13 is an illustrative code listing for an example Zoom-Pattern and PanPattern classes that are employed to provide methods that match particular zoom pattern regular expressions of interest. In both this and the previous Vsys class listing, the key lines of interest are the 're.compile' lines which compile a PCRE-style regular expression into a Python object which has a corresponding match method. The calls to determine if the regexp patterns match any given line are wrapped in a corresponding method of the parent class.

FIG. 17 is an illustrative code listing for an example of the relevant portion of the ProbePattern class. This class contains methods which in turn reference regular expressions that match various types of tool probe commands, from net probes, to Path probes to Term(inal) probes to Inst(ance) probes, both adding and deleting probes. The 'add_net_add_net' property in the bottom of the vunit of FIG. 16 makes several calls to pp.add_net( ). 'pp' is an instance of the ProbePattern class of FIG. 17, and we can see that the add_net method (See lines labeled 1702 within the class definition) returns whether or not the patt_prb_add_net regular expression matches the given line or not, i.e. if the current line matches a '\\a\s+geAddNetProbe' regular expression, i.e. starts with a \a, followed by an optional space, followed by 'geAddNetProbe'. Other methods match other types of probe addition/deletion commands.

Hardware Embodiment

Figure 18:
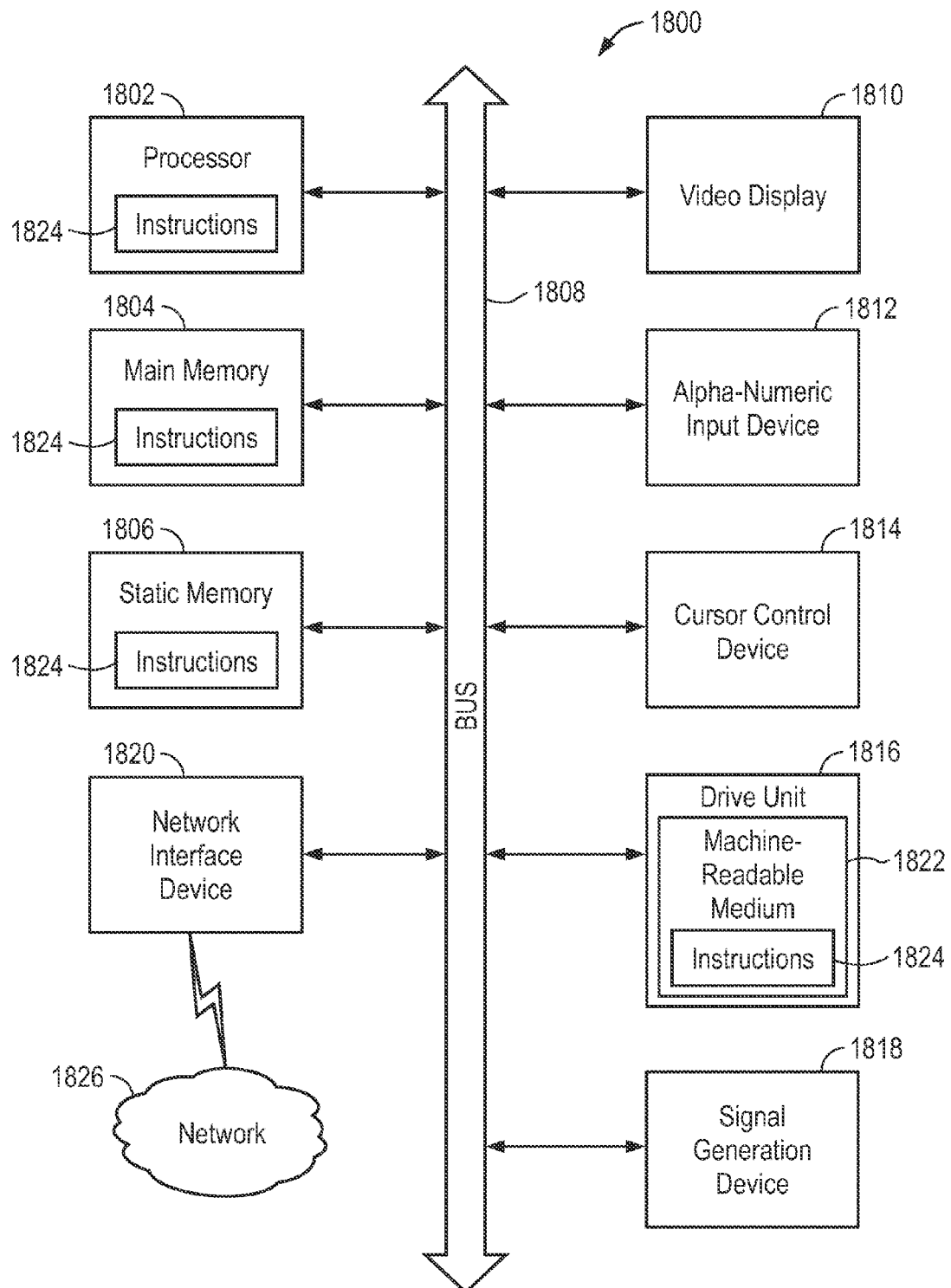
FIG. 18 is a block diagram of a computer processing system within which a set of instructions, for causing the computer to perform any one or more of the methodologies discussed herein, may be executed.

FIG. 18 is a block diagram of a computer processing system within which a set of instructions, for causing the computer to perform any one or more of the methodologies discussed herein, may be executed. In some embodiments, the computer operates as a standalone device or may be connected (e.g., networked) to other computers. In a networked deployment, the computer may operate in the capacity of a server or a client computer in server-client network environment, or as a peer computer in a peer-to-peer (or distributed) network environment. In a networked deployment, the computer may operate in the capacity of a server or a client computer in a server-client network environment, or as a peer computer in a peer-to-peer (or distributed) network environment.

Embodiments may also, for example, be deployed by Software-as-a-Service (SaaS), Application Service Provider (ASP), or utility computing providers, in addition to being sold or licensed via traditional channels. The computer may be a server computer, a personal computer (PC), a tablet PC, a set-top box (STB), a Personal Digital Assistant (PDA), cellular telephone, or any processing device capable of executing a set of instructions (sequential or otherwise) that specify actions to be taken by that device. Further, while only a single computer is illustrated, the term "computer" shall also be taken to include any collection of computers that individually or jointly execute a set (or multiple sets) of instructions to perform any one or more of the methodologies discussed herein.

The example computer processing system 1800 includes processor 1822 (e.g., a central processing unit (CPU), a graphics processing unit (GPU) or both), main memory 1804 and static memory 1806, which communicate with each other via bus 1808. The processing system can be configured, for example, to implement the FSM of FIG. 6. The processing system 1200 may further include video display unit 1820 (e.g., a plasma display, a liquid crystal display (LCD) or a cathode ray tube (CRT)). The display can be used to display code listings within a log file indicative of UI events, for example. The processing system 1200 also includes alphanumeric input device 2122 (e.g., a keyboard), a user interface (UI) navigation device 1814 (e.g., a mouse, touch screen, or the like), a disk drive unit 1816, a signal generation device 1818 (e.g., a speaker), and a network interface device 1820.

The disk drive unit 1826 includes computer-readable medium 1822 on which is stored one or more sets of instructions and data structures (e.g., software 1824) embodying or utilized by any one or more of the methodologies or functions described herein. The software 1824 may also reside, such as that used to configure a computer system to implemented the processes of FIGS. 4 and 8-10, completely or at least partially, within a computer readable storage device such as the main memory 1804 and/or within the processor 1822 during execution thereof by the processing system 1200, the main memory 1804 and the processor 1822 also constituting computer-readable, tangible media.

The software 1824 may further be transmitted or received over network 1826 via a network interface device 1820 utilizing any one of a number of well-known transfer protocols (e.g., HTTP).

While the computer-readable medium 1822 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding or carrying a set of instructions for execution by the computer and that cause the computer to perform any one or more of the methodologies of the present application, or that is capable of storing, encoding or carrying data structures utilized by or associated with such a set of instructions. The term "computer-readable medium" shall accordingly be taken to include, but not be limited to, solid-state memories, and optical and magnetic media.

While the invention(s) is (are) described with reference to various implementations and exploitations, it will be understood that these embodiments are illustrative and that the scope of the invention(s) is not limited to them. In general, techniques for maintaining consistency between data structures may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

The invention claimed is:

1. A method to evaluate user interaction with a computer user interface (UI) comprising:

receiving a property definition, written in a property specification language developed for hardware verification, that identifies multiple string patterns and one or more respective chunk identifying patterns and a temporal relationship among the identified multiple string patterns, wherein the identified multiple string patterns correspond to one or more UI events from the computer user interface of an integrated circuit design tool, wherein the property specification language is one of PSL and SVA;

receiving a log file in a non-transitory computer readable storage device that includes a plurality of respective chunks of information;

wherein at least some of the respective chunks of information include string patterns that correspond to respective UI events and include respective chunk identifying patterns are indicative of kinds of events;

for each of a plurality of respective chunks of information within the log file, determining with a modified hardware verification tool whether the respective chunk includes a chunk identifying pattern that matches at least one of the one or more identified chunk identifying patterns;

in response to a determination that a respective chunk within the log file includes a chunk identifying pattern that matches at least one of the one or more identified chunk identifying patterns, determining with the modified hardware verification tool whether one or more respective string patterns within the respective chunk within the log file matches one or more of the identified multiple string patterns;

producing a trace record that includes a respective trace entry for respective determinations as to whether respective string patterns, from one or more chunks determined to include matching chunk identifying patterns, match respective string patterns from among the identified multiple string patterns; and configuring a processor to implement a finite state machine to evaluate whether trace entries within the produced trace record indicate that the property is satisfied based upon the string pattern matching determinations for the respective chunks within the log file determined to include respective chunk identifying patterns that respectively match at least one of the one or more identified chunk identifying patterns.

2. The method of claim 1, wherein the respective string patterns are ordered chronologically within the log file according to an order of occurrence of the respective UI events to which they correspond.

3. The method of claim 1, wherein the property definition identifies an expression that defines the temporal relationship among the identified multiple string patterns.

4. The method of claim 3, further comprising encoding the expression in a machine readable storage device.

5. The method of claim 1, wherein the string patterns include code listings.

6. The method of claim 1, wherein the produced log file further includes respective chunk identifying indicia to indicate the kind of entries contained within respective chunks.

7. The method of claim 1, wherein the produced log file further includes respective chunk identifying indicia to indicate the kind of string patterns contained within respective chunks; and
wherein performing the step of determining whether the respective chunk includes a respective string pattern that matches at least one of the identified multiple string patterns includes performing such act of determining only for respective chunks that respective chunk identifying indicia indicate contain prescribed kinds of string patterns.

8. The method of claim 1, wherein respective chunks are chronologically ordered within the log file;
wherein the produced log file further includes respective chunk identifying indicia to indicate the kind of string patterns contained within respective chunks; and
wherein the respective stored indicia are ordered chronologically according to the order of the respective chunks to which they correspond.

9. The method of claim 1, wherein the one or more UI events includes a user input.

10. The method of claim 1, wherein the one or more UI events includes at least one of a system-generated user prompt, a system-generated warning message, a system-generated error message and system-generated diagnostics message.

11. The method of claim 1 wherein the produced log file further includes respective chunk identifying indicia to indicate the kind of entries contained within respective chunks; and
wherein the chunk identifying indicia indicate whether respective chunks contain a user input or a system-generated message.

12. The method of claim 1 wherein the property definition is stored in a vunit file.

13. The method of claim 1 wherein the property definition includes whether a user interaction was one of completed and canceled.

14. The method of claim 1 wherein the temporal relationship describes whether a particular first user interaction occurred within a specified number of user interface events of a particular second user interaction.

15. A method to evaluate user interaction with a computer user interface (UI) comprising:
receiving a property definition, written in a property specification language developed for hardware verification, that identifies multiple string patterns and one or more respective chunk identifying patterns and at least one relationship among the identified multiple string patterns, wherein the identified multiple string patterns correspond to one or more UI events from the computer user interface of an integrated circuit design tool, wherein the property specification language is one of PSL and SVA;
receiving a log file in a non-transitory computer readable storage device that includes a plurality of respective chunks of information;
wherein at least some of the respective chunks of information include string patterns that correspond to respective UI events and include respective chunk identifying patterns are indicative of kinds of events;
for each of a plurality of respective chunks of information within the log file, determining with a modified hardware verification tool whether the respective chunk includes a chunk identifying pattern that matches at least one of the one or more identified chunk identifying patterns;
in response to a determination that a respective chunk within the log file includes a chunk identifying pattern that matches at least one of the one or more identified chunk identifying patterns, determining with the modified hardware verification tool whether one or more respective string patterns within the respective chunk within the log file matches one or more of the identified multiple string patterns;
producing a trace record that includes a respective trace entry for respective determinations as to whether respective string patterns, from one or more chunks determined to include matching chunk identifying patterns, match respective string patterns from among the identified multiple string patterns; and
configuring a processor to implement a finite state machine to evaluate whether trace entries within the produced trace record indicate that the property is satisfied based upon the string pattern matching determinations for the respective chunks within the log file determined to include respective chunk identifying patterns that respectively match at least one of the one or more identified chunk identifying patterns;
wherein the produced log file further includes respective chunk identifying indicia to indicate the kind of entries contained within respective chunks;
wherein the chunk identifying indicia indicate whether respective chunks contain a user input or a system-generated message; and
wherein performing the step of determining whether the respective chunk includes a respective string pattern that matches at least one of the identified multiple string patterns includes performing such act of determining only for respective chunks that respective chunk identifying indicia indicate contain prescribed kinds of string patterns.

16. The method of claim 1, wherein determining whether the respective chunk includes a respective string pattern that matches at least one of the identified multiple string patterns includes parsing information in the respective chunk to determine whether the parsed information matches a prescribed regular expression.

17. The method of claim 1, wherein the property definition identifies an expression that defines a temporal relationship among the identified multiple string patterns; and
wherein configuring the processor includes configuring the processor to implement a finite state machine that evaluates whether the string pattern matching determinations satisfy the temporal relationship identified by the property.

18. The method of claim 1, wherein the property definition identifies an expression that defines a temporal relationship among the identified string patterns;
wherein respective chunks are chronologically ordered within the log file;
wherein the respective trace entries within the produced trace record are ordered chronologically according to the order of the respective chunks to which they correspond; and
wherein configuring the processor includes configuring the processor to implement a finite state machine that evaluates whether the string pattern matching determinations satisfy the temporal relationship identified by the property.

19. An article of manufacture that includes a non-transitory computer readable storage device encoded with program code to configure a computer system to perform a process that includes:
receiving a property definition, written in a property specification language developed for hardware verification, that identifies multiple string patterns and one or more respective chunk identifying patterns and at least one relationship among the identified multiple string patterns, wherein the identified multiple string patterns correspond to one or more user interface (UI) events from the computer user interface of an integrated circuit design tool, wherein the property specification language is one of PSL and SVA;
receiving a log file in a non-transitory computer readable storage device that includes a plurality of respective chunks of information;
wherein at least some of the respective chunks of information include string patterns that correspond to respective UI events and include respective chunk identifying patterns are indicative of kinds of events;
for each of a plurality of respective chunks of information within the log file, determining with a modified hardware verification tool whether the respective chunk includes a chunk identifying pattern that matches at least one of the one or more identified chunk identifying patterns;
in response to a determination that a respective chunk within the log file includes a chunk identifying pattern that matches at least one of the one or more identified chunk identifying patterns, determining with the modified hardware verification tool whether one or more respective string patterns within the respective chunk within the log file matches one or more of the identified multiple string patterns;
producing a trace record that includes a respective trace entry for respective determinations as to whether respective string patterns, from one or more chunks determined to include matching chunk identifying patterns, match respective string patterns from among the identified multiple string patterns; and
configuring a processor to implement a finite state machine to evaluate whether trace entries within the produced trace record indicate that the property is satisfied based upon the string pattern matching determinations for the respective chunks within the log file determined to include respective chunk identifying patterns that respectively match at least one of the one or more identified chunk identifying patterns;
wherein the produced log file further includes respective chunk identifying indicia to indicate the kind of entries contained within respective chunks;
wherein the chunk identifying indicia indicate whether respective chunks contain a user input or a system-generated message; and
wherein performing the step of determining whether the respective chunk includes a respective string pattern that matches at least one of the identified multiple string patterns includes performing such act of determining only for respective chunks that respective chunk identifying indicia indicate contain prescribed kinds of string patterns.

20. The article of claim 19, wherein the one or more UI events includes at least one of a user input, a system-generated user prompt, a system-generated warning message, a system-generated error message, and a system-generated diagnostics message.

21. A system that includes a processor and a non-transitory machine readable storage device encoded with program code to configure a computer system to perform a process that includes:
receiving a property definition, written in a property specification language developed for hardware verification, that identifies multiple string patterns and one or more respective chunk identifying patterns and a temporal relationship among the identified multiple string patterns, wherein the identified multiple string patterns correspond to one or more user interface (UI) events from the computer user interface of an integrated circuit design tool, wherein the property specification language is one of PSL and SVA;
receiving a log file in a non-transitory computer readable storage device that includes a plurality of respective chunks of information;
wherein at least some of the respective chunks of information include string patterns that correspond to respective UI events and include respective chunk identifying patterns are indicative of kinds of events;
for each of a plurality of respective chunks of information within the log file, determining with a modified hardware verification tool whether the respective chunk includes a chunk identifying pattern that matches at least one of the one or more identified chunk identifying patterns;
in response to a determination that a respective chunk within the log file includes a chunk identifying pattern that matches at least one of the one or more identified chunk identifying patterns, determining with the modified hardware verification tool whether one or more respective string patterns within the respective chunk within the log file matches one or more of the identified multiple string patterns;
producing a trace record that includes a respective trace entry for respective determinations as to whether respective string patterns, from one or more chunks determined to include matching chunk identifying patterns, match respective string patterns from among the identified multiple string patterns; and
configuring a processor to implement a finite state machine to evaluate whether trace entries within the produced trace record indicate that the property is satisfied based upon the string pattern matching determinations for the respective chunks within the log file determined to include respective chunk identifying patterns that respectively match at least one of the one or more identified chunk identifying patterns.

22. A system that includes a processor and a non-transitory machine readable storage device encoded with program code to configure a computer system to perform a process comprising:

storing, in the storage device, a property definition, written in a property specification language developed for hardware verification, that identifies multiple string patterns and one or more respective chunk identifying patterns and at least one relationship among the identified multiple string patterns, wherein the identified multiple string patterns correspond to one or more user interface (UI) events from the computer user interface of an integrated circuit design tool, wherein the property specification language is one of PSL and SVA;

storing, in the storage device, a log file in a non-transitory computer readable storage device that includes a plurality of respective chunks of information;

wherein at least some of the respective chunks of information include string patterns that correspond to respective UI events and include respective chunk identifying patterns are indicative of kinds of events;

determining, with a modified hardware verification tool, for each of a plurality of respective chunks of information within the log file, whether the respective chunk includes a chunk identifying pattern that matches at least one of the one or more identified chunk identifying patterns;

determining, with the modified hardware verification tool, in response to a determination that a chunk within the log file includes a chunk identifying pattern that matches at least one of the one or more chunk identifying patterns, from one or more chunks determined to include matching chunk identifying patterns, whether one or more respective string patterns within the respective chunk within the log file matches one or more of the identified multiple string patterns;

producing a trace record that includes a respective trace entry for respective determinations as to whether respective string patterns, from one or more chunks determined to include matching chunk identifying patterns, match respective string patterns from among the identified multiple string patterns; and configuring the processor to implement a finite state machine to evaluate whether trace entries within the produced trace record indicate that the property is satisfied based upon the string pattern matching determinations for the respective chunks within the log file determined to include respective chunk identifying patterns that respectively match at least one of the one or more identified chunk identifying patterns;

wherein the produced log file further includes respective chunk identifying indicia to indicate the kind of entries contained within respective chunks;

wherein the chunk identifying indicia indicate whether respective chunks contain a user input or a system-generated message; and wherein performing the step of determining whether the respective chunk includes a respective string pattern that matches at least one of the identified multiple string patterns includes performing such act of determining only for respective chunks that respective chunk identifying indicia indicate contain prescribed kinds of string patterns.

23. The system of claim 22, wherein the processor is configured to implement a comparator that determines whether one or more string patterns within a file stored in the storage device match one or more corresponding string patterns identified within the property definition.

* * * * *